（12）United States Patent
Dong et al.

(10) Patent No.: US 10,351,253 B2
(45) Date of Patent: Jul. 16, 2019

(54) BATTERY INTEGRATED ISOLATED POWER CONVERTER AND SYSTEMS FOR ELECTRIC VEHICLE PROPULSION

(71) Applicant: General Electric Company, Schenectady, NY (US)

(72) Inventors: Dong Dong, Schenectady, NY (US); Manoj Ramprasad Shah, Latham, NY (US); Rui Zhou, Niskayuna, NY (US); Hao Huang, Troy, OH (US); Di Zhang, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 641 days.

(21) Appl. No.: 14/984,992

(22) Filed: Dec. 30, 2015

(65) Prior Publication Data
US 2017/0190434 A1     Jul. 6, 2017

(51) Int. Cl.
| | | |
|---|---|---|
| *B64D 27/24* | (2006.01) | |
| *H02M 7/797* | (2006.01) | |
| *H02M 5/458* | (2006.01) | |
| *H02M 7/483* | (2007.01) | |

(Continued)

(52) U.S. Cl.
CPC ............ *B64D 27/24* (2013.01); *H02M 5/458* (2013.01); *H02M 7/483* (2013.01); *H02M 7/797* (2013.01); *B60Y 2200/51* (2013.01); *B60Y 2200/92* (2013.01); *B64D 2027/026* (2013.01); *B64D 2221/00* (2013.01); *H02M 2001/0077* (2013.01); *H02M 2007/4835* (2013.01); *Y10S 903/903* (2013.01)

(58) Field of Classification Search
CPC ................... Y10T 307/707; H02M 2001/0077
See application file for complete search history.

(56) References Cited

U.S. PATENT DOCUMENTS

| | | |
|---|---|---|
| 7,701,082 B2 | 4/2010 | Lazarovich et al. |
| 8,218,341 B2 | 7/2012 | Wiegman et al. |
| 8,575,778 B2 | 11/2013 | Chen |

(Continued)

FOREIGN PATENT DOCUMENTS

| | | | | |
|---|---|---|---|---|
| EP | 2290799 A1 | * | 3/2011 | ......... H02M 7/4807 |
| WO | 2014158240 A2 | | 10/2014 | |
| WO | 2015034517 A1 | | 3/2015 | |

OTHER PUBLICATIONS

Jiang et al., "Flexible multiobjective control of power converter in active hybrid fuel cell/battery power sources", Power Electronics, IEEE Transactions on, vol. 20, Issue: 1, pp. 244-253, Jan. 2005.

(Continued)

*Primary Examiner* — Fritz M Fleming
(74) *Attorney, Agent, or Firm* — Christopher R. Carroll; The Small Patent Law Group LLC

(57) ABSTRACT

An electric propulsion system includes at least one generator. The electric propulsion system also includes at least one drive engine coupled to the at least one generator. The electric propulsion system further includes at least one electrical device. The electric propulsion system also includes at least one battery integrated isolated power converter (BIIC), where the at least one generator and at least one of the at least one BIIC and the at least one electrical device are coupled, and where the at least one BIIC and the at least one electrical device are coupled.

13 Claims, 14 Drawing Sheets

(51) Int. Cl.
 B64D 27/02 (2006.01)
 H02M 1/00 (2006.01)

(56) References Cited

U.S. PATENT DOCUMENTS

| | | |
|---|---|---|
| 8,791,589 B2 | 7/2014 | Colello et al. |
| 8,792,253 B2 | 7/2014 | Wang et al. |
| 8,944,367 B2 | 2/2015 | Bystry, Jr. et al. |
| 9,007,020 B2 | 4/2015 | Prosser et al. |
| 9,013,066 B2 | 4/2015 | Kojori et al. |
| 9,071,141 B2 | 6/2015 | Dong et al. |
| 2009/0196082 A1* | 8/2009 | Mazumder ............ H02M 5/458 363/132 |
| 2012/0248866 A1 | 10/2012 | Takeuchi et al. |
| 2013/0307324 A1 | 11/2013 | Johannsen et al. |
| 2013/0310994 A1 | 11/2013 | Schroeter |
| 2014/0117770 A1 | 5/2014 | Emadi et al. |
| 2014/0333127 A1 | 11/2014 | Edwards |
| 2015/0108844 A1 | 4/2015 | Zhou et al. |
| 2015/0138859 A1 | 5/2015 | Zhou et al. |

OTHER PUBLICATIONS

Lacressonniere F. et al.,"Experimental validation of a hybrid emergency network with low and medium voltage Li-Ion batteries for more electrical aircraft",Power Electronics and Applications (EPE), 2013 15th European Conference on, pp. 1-9, Sep. 2-6, 2013, Lille.
Tan Boxue et al.,"Development of a Novel Large Capacity Charger for Aircraft Battery", Intelligent Computation Technology and Automation (ICICTA), 2010 International Conference on, pp. 90-93,vol. 2, May 11-12, 2010, Changsha.
Hoadley, R., "Using a Synchronous Converter for Harmonic Mitigation with AC Drives," Oct. 1, 2003, (10 pgs.). Retrieved from website http://literature.rockwellautomation.com/idc/groups/literature/documents/wp/drives-wp017_-en-p.pdf.
Product information, "From Modules Off The Shelf To Customized Power Conversion Solutions," retrieved on Oct. 14, 2015 from website http://www.convergy-powerconverter.com/from-modules-off-the-shelf-to-customized-power-conversion-solutions_369_1.html.
Solanki, J. et al., "A Completely Modular Power Converter for High-Power High-Current DC Applications," Industrial Electronics Society, IECON 2013—39th Annual Conference of the IEEE, Nov. 10-13, 2013, Vienna, pp. 151-156, retrieved from website http://ieeexplore.ieee.org/xpl/articleDetails.jsp?arnumber=6699127.
Solanki, J. et al., "A Modular Multilevel Converter Based High-Power High-Current Power Supply," 2013 IEEE International Conference on Industrial Technology (ICIT), IEEE, Feb. 25-28, 2013, Cape Town, South Africa, pp. 444-450. Retrieved from website http://wwwlea.uni-paderborn.de/fileadmin/Elektrotechnik/AG-LEA/forschung/veroeffentlichungen/2013/2013_Solanki_ICIT.pdf.
Huang, H., "Challenges in Electrical Power Systems for More Electric Aircraft (MEA)," GE Aviation Systems LLC, Mar. 16, 2015. Retrieved from website http://www.apec-conf.org/wp-content/uploads/2015APEC_Plenary_HaoHuang.pdf and http://www.apec-conf.org/wp-content/uploads/Speaker1_Hao_Huang.pdf.
Dong, D., "Ac-dc Bus-interface Bi-directional Converters in Renewable Energy Systems," Virginia Polytechnic Institute and State University, Jul. 25, 2012, pp. i-250, Blacksburg, Virginia. Retrieved from http://scholar.lib.vt.edu/theses/available/etd-08022012-151006/unrestricted/Dong_D_D_2012.pdf.

\* cited by examiner

BATTERY INTEGRATED ISOLATED POWER CONVERTER AND SYSTEMS FOR ELECTRIC VEHICLE PROPULSION

BACKGROUND

The field of the disclosure relates generally to power converters, and, more specifically, to battery integrated isolated power converters for hybrid-electric or all-electric vehicle propulsion systems.

In large vehicles such as aircraft, it is beneficial for hybrid-electric or all-electric propulsion, power converter, and energy storage systems to maximize the specific power, i.e., kilowatts per kilogram (kW/kg) of these components of the power system. To improve performance of propulsion systems, the specific power values of known power converters for hybrid-electric or all-electric vehicle propulsion must be increased. Moreover, known power converters for hybrid-electric or all-electric vehicle propulsion systems need to reliably supply power to critical propulsion equipment at all times, without being impacted whatsoever by power needs of, or electrical faults in accessory systems. In such known power converters for hybrid-electric or all-electric vehicle propulsion systems, interrupting power to the least number of electrical load components as possible is problematic and often results in diminished performance of the main propulsion system due to faults in individual non-propulsion accessory equipment.

At least some known power converters for hybrid-electric or all-electric vehicle propulsion systems utilize modular multi-level converter (MMC) architecture. Controllers for MMCs in such known power converters for hybrid-electric or all-electric vehicle propulsion systems must not only switch the MMC submodules, including those with insulated-gate bipolar transistors (IGBTs) or MOSFETs, they must also implement complex control algorithms with sophisticated high speed computing and communications to continually balance the voltages of each submodule capacitor.

The MMCs of such known power converters for hybrid-electric or all-electric vehicle propulsion systems utilize large energy storage capacitors on each MMC valve submodule as independently controllable two-level converters and voltage sources for AC or DC electrical loads. Also, in such known power converters for hybrid-electric or all-electric vehicle propulsion systems, isolation of power system components such as batteries require large line frequency transformers for enhanced safety and reduction of common mode interference. Many of these known power converters for hybrid-electric or all-electric vehicle propulsion systems utilize heavy and bulky passive components, e.g., capacitors and inductors, amounting to more than half of their weight.

BRIEF DESCRIPTION

In one aspect, an electric propulsion system for a vehicle is provided. The electric propulsion system includes at least one generator. The electric propulsion system also includes at least one drive engine coupled to the at least one generator. The electric propulsion system further includes at least one electrical device. The electric propulsion system also includes at least one battery integrated isolated power converter (BIIC), where the at least one generator and at least one of the at least one BIIC and the at least one electrical device are coupled, and where the at least one BIIC and the at least one electrical device are coupled.

In another aspect, a BIIC is provided. BIIC includes at least one BIIC module (BIICM) string. BIICM string includes a plurality of BIICMs coupled to each other. Each BIICM of the plurality of BIICMs includes a first BIICM circuit including a first plurality of switching devices coupled together. Each BIICM of the plurality of BIICMs also includes a second BIICM circuit including a second plurality of switching devices coupled together. Each BIICM of the plurality of BIICMs further includes a BIICM high-frequency transformer coupled to and between the first BIICM circuit and the second BIICM circuit, where the first BIICM circuit and the second BIICM circuit are physically isolated and inductively coupled through the BIICM high-frequency transformer.

DRAWINGS

These and other features, aspects, and advantages of the present disclosure will become better understood when the following detailed description is read with reference to the accompanying drawings in which like characters represent like parts throughout the drawings, wherein.

Figure 1:
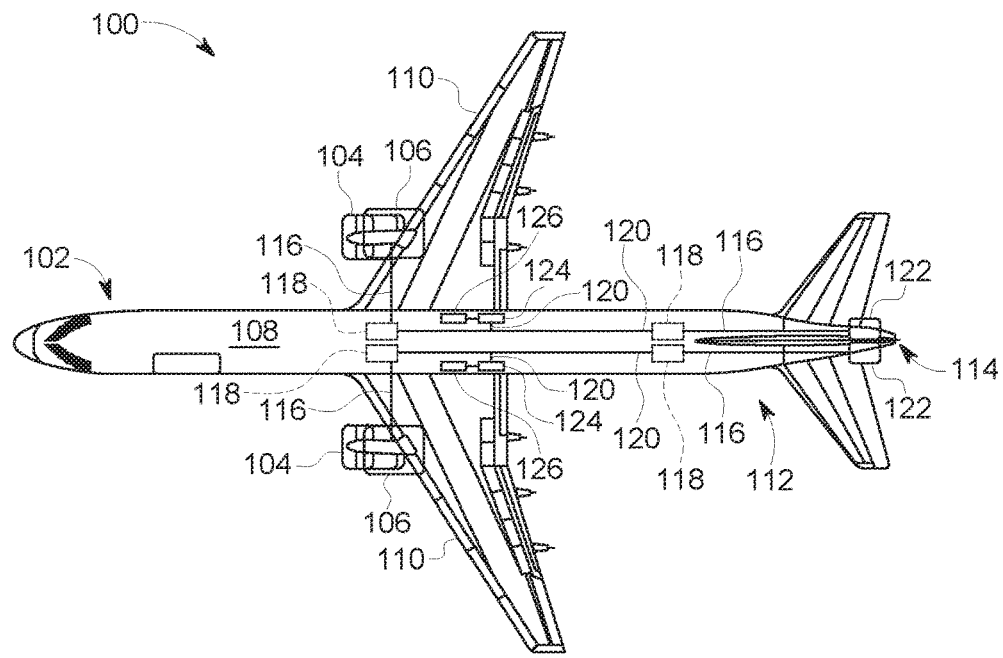
FIG. 1 is a generalized schematic view of a prior art electric vehicle propulsion system superimposed on a plan view of an aircraft.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

The battery integrated isolated power converters (BIICs) described herein are suited to increasing the specific power, i.e., kilowatt/kilogram (kW/kg), of electric vehicle propulsion systems by reducing the number and weight of passive components and cables. Specifically, the BIICs described herein do not require a large number of passive filtering capacitors because the rates of change of voltage with time, i.e., dv/dt, of individual battery integrated power converter modules (BIICMs) are small relative to known power converters in known electric vehicle propulsion systems. Further, specifically, tight control of dv/dt in individual BIICMs results in low levels of harmonic distortion and electromagnetic interference (EMI) relative to known power converters for electric vehicle propulsion systems. Further, such BIICs are more modular, sealable, reliable, as well as easier to maintain and manufacture relative to known power converters for electric vehicle propulsion systems. Furthermore, a wide variety of energy storage devices are adaptable to use with the BIICs described herein, which facilitates incorporation of more advanced energy storage devices into electric vehicle propulsion systems without replacement of power converter components. Moreover, the BIICs described herein provide effective physical and galvanic isolation of energy storage devices, including, without limitation, direct current (DC) batteries, from other components of the BIICs and the overall power system, thus enhancing safety and reliability in electric vehicle propulsion systems. As such, the BIICs described herein utilize energy storage devices to not only provide energy for electric vehicle propulsion, but also to act as voltage sources to enable multi-level power converter operations without additional film capacitors, and at the same time reduce the requirements of using filtering component elements relative to known power converters for electric vehicle propulsion systems.

FIG. 1 is a generalized schematic view of a prior art electric vehicle propulsion system 100 superimposed on a plan view of an aircraft. Prior art electric vehicle propulsion system 100 for a vehicle 102 includes at least one drive engine 104, including an internal combustion engine, coupled to vehicle 102. At least one generator 106 is coupled to at least one drive engine 104 and to vehicle 102. At least one drive engine 104 functions as a prime mover for at least one generator 106 to provide torque to turn the rotor of at least one generator 106 to induce an alternating current (AC) in a stator of at least one generator 106. In the case where vehicle 102 is an aircraft, aircraft further includes a fuselage 108, at least one wing 110, and an aft portion 112, including, without limitation, a tail 114.

In some embodiments of prior art electric vehicle propulsion systems 100, AC current is transmitted on at least one AC line 116 from at least one generator 106 to at least one bi-directional AC/DC power converter 118, which converts AC power from generator 106 to DC power. Bi-directional AC/DC power converter 118 includes conventional AC/DC power convertors, i.e., not BIICs as described herein. DC power from bi-directional AC/DC power converter 118 is carried to at least one additional bi-directional AC/DC power converter 118 on at least one transmission line 120 of a DC type. For additional bi-directional AC/DC power converter 118, at least one electrical device 122 is supplied with AC power on at least one additional AC line 116. By way of additional transmission line 120 of a DC type, at least one bi-directional DC/DC power converter 124 is coupled to and between DC type transmission line 120 and at least one battery bank 126. Electrical energy stored in battery bank 126 is made available to power electrical device 122 when needed, as where full capacity operation of generator 106 is unavailable or undesirable. Likewise, where full capacity operation of generator 106 supplies power in excess of that required by electrical device 122, battery bank 126 is charged, if needed. In the case where vehicle 102 is an aircraft, electrical device 122 includes at least one fan motor used for vehicle propulsion including, without limitation, during taxiing on a runway.

Figure 2:
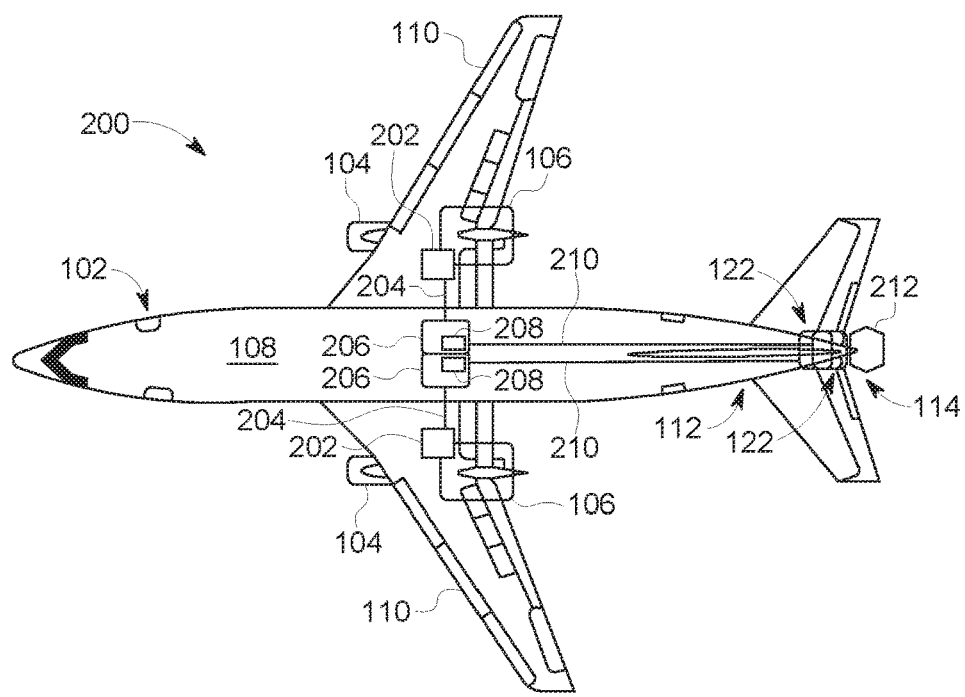
FIG. 2 is a schematic view of an exemplary embodiment of an electric vehicle propulsion system superimposed on a plan view of an aircraft.

FIG. 2 is a schematic view of an exemplary embodiment of an electric vehicle propulsion system 200 superimposed on a plan view of an aircraft. In the exemplary embodiment, vehicle 102 is an aircraft, as shown as described above with reference to FIG. 1. Also, in the exemplary embodiment, at least one generator rectifier 202 is coupled to vehicle 102 and to generator 106. Generator rectifier 202 includes rectifiers known in the art including, without limitation, half-wave rectifiers, full-wave rectifiers, bridge rectifiers, rectifiers with at least one diode, and rectifiers without at least one diode. Generator rectifier 202 is configured to rectify an AC power output of generator 106 and to transmit a DC power on at least one generator cable 204 to at least one battery integrated isolated power converter (BIIC) 206 located in fuselage 108 proximate wing 110. Further, in the exemplary embodiment, generator cable 204 is a DC cable.

Also, in the exemplary embodiment, BIIC 206 includes at least one energy storage device 208, including, without limitation, a DC energy storage device such as at least one battery, collocated with BIIC 206. Further, in the exemplary embodiment, BIIC 206 is configured to function as a DC-to-AC power converter which receives DC power from generator rectifier 202 and transmits AC power to electrical device 122 on at least one BIIC cable 210. Further, in the exemplary embodiment, electrical device 122 includes at least one fan motor 212 used for vehicle propulsion during taxiing on a runway, i.e., where vehicle 102 is an aircraft. In an alternative embodiment, not shown, BIIC 206 is located in aft portion 112 of fuselage 108 proximate tail 114. As such, it is possible to use longer lengths of DC type generator cable 204 for coupling generator rectifier 202 to BIIC 206 relative to electric vehicle propulsion system 200 shown and described with reference to FIG. 2. Likewise, shorter lengths of AC type BIIC cable 210 are used for coupling BIIC 206 to electrical device 122 relative to the exemplary electric vehicle propulsion system 200. Thus, use of shorter lengths of AC type BIIC cable 210 and longer lengths of DC type generator cable 204 facilitates decreasing the weight of electric vehicle propulsion system 200 relative to the exemplary embodiment shown and described with reference to FIG. 2.

In operation of the exemplary embodiment, rectified DC power from generator rectifier 202, either alone or in combination with DC power from energy storage device 208, is converted by BIIC 206 to AC power transmitted to electrical device 122. BIIC 206 diverts at least a portion of DC power from generator rectifier 202 to charge energy storage device 208 when energy storage device 208 does not adequately supply power to electrical device 122. In that case, a larger portion of DC power from generator rectifier 202 is converted to AC power by BIIC 206 to supply AC power to electrical device 122 than when energy storage device 208 fully supplies AC power to electrical device 122. When energy storage device 208 is fully supplying power to electrical device 122, a mechanical load placed upon drive engine 104 by generator 106 is lower than when generator rectifier 202 is supplying DC power to one or both of electrical device 122 and energy storage device 208, i.e., for charging. Moreover, in operation of the exemplary embodiment, inclusion of generator rectifier 202 facilitates coupling of DC cable, rather than larger and heavier AC cable, between generator 106 and BIIC 206, thus increasing the specific power, i.e., kW/kg, of the exemplary electric vehicle propulsion system 200 relative to electric vehicle propulsion system 100 shown and described above with reference to FIG. 1.

Figure 3:
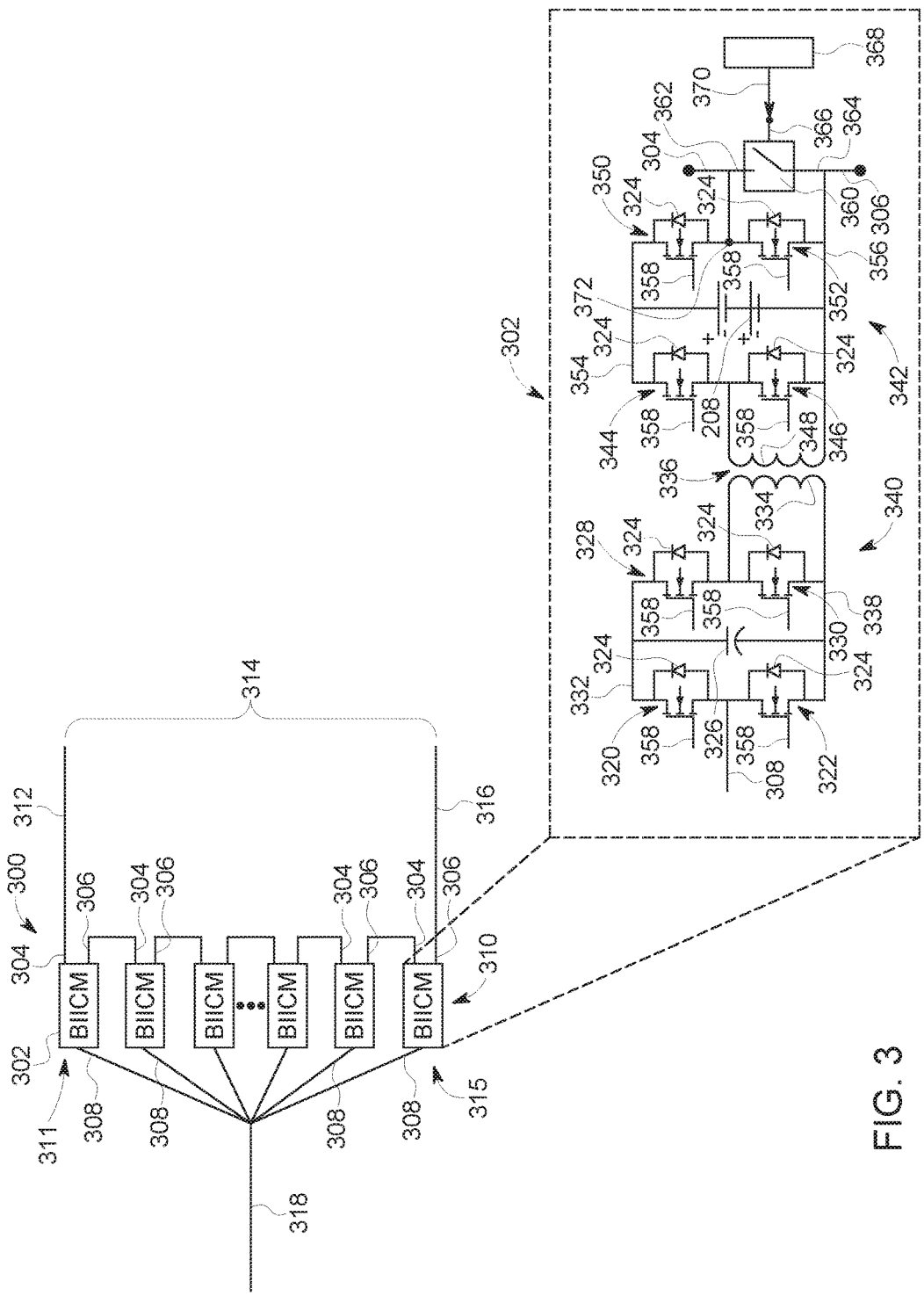
FIG. 3 is a schematic diagram of an exemplary bi-directional AC-to-DC battery integrated isolated power converter (BIIC) that may be used in the electric vehicle propulsion system shown in FIG. 2.

FIG. 3 is a schematic diagram of an exemplary bi-directional AC-to-DC BIIC 300 that may be used in the electric vehicle propulsion system 200 shown in FIG. 2. In the exemplary embodiment, bi-directional AC-to-DC BIIC 300 includes at least one bi-directional AC-to-DC BIIC module (bi-directional AC-to-DC BIICM) 302 including a first DC terminal 304 and a second DC terminal 306. Bi-directional AC-to-DC BIICM 302 also includes a first node 308 configured to receive and transmit a phase of AC power. Also, in the exemplary embodiment, a plurality of bi-directional AC-to-DC BIICMs 302 are arranged in at least one string 310. First DC terminal 304 of a first bi-directional AC-to-DC BIICM 302 of string 310, i.e., the topmost bi-directional AC-to-DC BIICM 302 (topmost BIICM 311) in FIG. 3, couples to a first DC line 312 of a DC link, including, without limitation, a high voltage DC link 314. Second DC terminal 306 of a last bi-directional AC-to-DC BIICM 302 of string 310, i.e., the bottommost bi-directional AC-to-DC BIICM 302 (bottommost BIICM 315) in FIG. 3, couples to a second DC line 316 of high voltage DC link 314. Further, in the exemplary embodiment, first DC terminals 304 and second DC terminals 306 of each bi-directional AC-to-DC BIICMs 302 of string 310 other than the first BIICM 302 and second BIICM 302, respectively, are serially coupled. Furthermore, in the exemplary embodiment, first node 308 of each bi-directional AC-to-DC BIICMs 302 of string 310 receives or transmits a phase of AC power on a first AC line 318. First AC line 318 includes BIIC cable 210 as shown and described with reference to FIG. 2. In other alternative embodiments shown and described below, first AC line 318 also includes AC type generator cable 204.

Also, in the exemplary embodiment, bi-directional AC-to-DC BIICM 302 that may be used in bi-directional AC-to-DC BIIC 300 includes first node 308 coupled to and between a first switching device 320 and a second switching device 322. First switching device 320 is serially coupled to second switching device 322. First switching device 320 and all switching devices hereinafter described include, without limitation, such devices as integrated gate commutated thyristors, non-linear controllable resistors, varistors, and transistors such as insulated-gate bipolar transistors (IGBTs), metal-oxide semiconductor field-effect transistors (MOSFETs), injection enhanced gate transistors, junction gate field-effect transistors (JFETs), bipolar junction transistors (BJTs), and combinations thereof. First switching device 320 and second switching device 322 each include an antiparallel diode 324 coupled in parallel thereto. These devices can be made of silicon (Si) or wide bandgap materials such as SiC or GaN. Also, in the exemplary embodiment, all switching devices hereinafter described also have antiparallel diode 324 coupled in parallel thereto.

Also, in the exemplary embodiment, at least one capacitor 326 is coupled in parallel across both of first switching device 320 and second switching device 322. Further, in the exemplary embodiment, a third switching device 328 and a fourth switching device 330 are serially coupled. Serially coupled third switching device 328 and fourth switching device 330 are coupled in parallel across both of first switching device 320 and second switching device 322. A second node 332 includes connections to and between first switching device 320, capacitor 326, and third switching device 328. A first winding 334 of a BIICM high-frequency transformer 336 is coupled in parallel to fourth switching device 330. In an alternative embodiment, not shown, first winding 334 is coupled in parallel to third switching device 328. BIICM high-frequency transformer 336 includes, without limitation, a high-frequency transformer configured to operate at frequencies from kilohertz (kHz) to megahertz (MHz) range. A third node 338 includes connections to and between second switching device 322, capacitor 326, fourth switching device 330, and first winding 334. Together, first node 308, first switching device 320, second switching device 322, capacitor 326, third switching device 328, fourth switching device 330, and first winding 334 form a first side 340, i.e., a first BIICM circuit, of bi-directional AC-to-DC BIICM 302.

Further, in the exemplary embodiment, bi-directional AC-to-DC BIICM 302 includes a second side 342, i.e., a second BIICM circuit. Second side 342 includes a fifth switching device 344 serially coupled to a sixth switching device 346. A second winding 348 of BIICM high-frequency transformer 336 is coupled in parallel to sixth switching device 346. In an alternative embodiment, not shown, second winding 348 is coupled in parallel to fifth switching device 344. At least one energy storage device 208 is coupled in parallel across both of fifth switching device 344 and sixth switching device 346. Also, in the exemplary embodiment, second side 342 includes a seventh switching device 350 serially coupled to an eighth switching device 352. Serially coupled seventh switching device 350 and eighth switching device 352 are coupled in parallel across both of fifth switching device 344 and sixth switching device 346. A node 354 includes connections to and between fifth switching device 344, energy storage device 208, and seventh switching device 350.

Furthermore, in the exemplary embodiment, second side 342 includes first DC terminal 304 coupled to and between seventh switching device 350 and eighth switching device 352. Second side 342 also includes second DC terminal 306 coupled to a fourth node 356. Fourth node 356 includes connections to and between second winding 348, sixth switching device 346, energy storage device 208, eighth switching device 352, and second DC terminal 306. In an alternative embodiment, not shown, energy storage device 208 and capacitor 326 are swapped in bi-directional AC-to-DC BIICM 302. Moreover, in the alternative embodiment, first side 340 and second side 342 are inductively coupled, i.e., galvanically coupled, through BIICM high-frequency transformer 336.

Moreover, in the exemplary embodiment, first 320, second 322, third 328, fourth 330, fifth 344, sixth 346, seventh 350, and eighth 352 switching devices include at least one switch control terminal 358 coupled to at least one switching controller, not shown in FIG. 3. Switching controller is configured to transmit at least one switch control signal to at least one of first 320, second 322, third 328, fourth 330, fifth 344, sixth 346, seventh 350, and eighth 352 switching devices to control its switching states. In an alternative embodiment, not shown, switching controller receives and transmits other control signals to and from other controllers located elsewhere within or outside bi-directional AC-to-DC BIIC 300, also not shown in FIG. 3.

Also, in the exemplary embodiment, bi-directional AC-to-DC BIICM 302 includes at least one bypass switch 360 including, without limitation, such devices as non-linear controllable resistors, varistors, and transistors such as IGBTs, MOSFETs, JFETs, BJTs, and relays. Bypass switch 360 includes a first bypass terminal 362 coupled to first DC terminal 304 and a second bypass terminal 364 coupled to second DC terminal 306, i.e., fourth node 356. Bypass switch 360 also includes at least a third bypass terminal, i.e., a bypass control terminal 366, coupled to at least one bypass switch controller 368. Bypass switch controller 368 is configured to transmit a control signal 370 to bypass control terminal 366 to close bypass switch 360 when at least one characteristic state associated with bi-directional AC-to-DC BIICM 302, including, without limitation, physically quantifiable states such as voltage, current, charge, and temperature, associated with energy storage device 208 is present. Likewise, bypass switch controller 368 is configured to transmit control signal 370 to bypass control terminal 366 to open bypass switch 360 when at least one characteristic state associated with bi-directional AC-to-DC BIICM 302 is not present. In an alternative embodiment, not shown, bypass switch 360 and bypass switch controller 368 are not coupled to bi-directional AC-to-DC BIICM 302. Further, in the exemplary embodiment, first DC terminal 304 is equivalent to a fifth node 372 defined between seventh switching device 350 and eighth switching device 352. Furthermore, in the exemplary embodiment, second DC terminal 306 is equivalent to fourth node 356.

In operation, in the exemplary embodiment, bi-directional AC-to-DC BIIC 300 converts AC power received on first AC line 318 into DC power transmitted to electrical device 122, not shown. Bi-directional AC-to-DC BIIC 300 is also capable to convert DC power received on high voltage DC link 314 into AC power transmitted on first AC line 318. Thus, in the exemplary embodiment, bi-directional AC-to-DC BIIC 300 functions as a bi-directional converter.

Also, in operation of in the exemplary embodiment, bi-directional AC-to-DC BIICM 302 converts a phase of AC power received on first node 308 into DC power transmitted to electrical device 122, not shown, on first DC terminal 304 and second DC terminal 306. Depending on a predetermined configuration of switching controllers and switching states, it is possible to divert a portion of DC power converted by second side 342 into energy storage device 208 to, for example, charge it. Also, in operation of the exemplary embodiment, it is possible to divert a portion of DC power stored in energy storage device 208, i.e., to discharge it, to supplement DC power transmitted on first DC terminal 304 and second DC terminal 306. Bi-directional AC-to-DC BIICM 302 is also capable to convert DC power received on first DC terminal 304 and second DC terminal 306 into AC power transmitted on first node 308. Thus, in the exemplary embodiment, each module of bi-directional AC-to-DC BIIC 300 functions as bi-directional AC-to-DC BIICM 302.

Also, in operation of the exemplary embodiment, the flow of at least one of an AC current and a DC current in the switching devices of both first side 340 and second side 342 is controlled through at least one switch control signal transmitted from at least one switching controller to at least one switch control terminal 358 of switching devices. As such, switching controller, along with the other aforementioned features and functions of bi-directional AC-to-DC BIICM 302, facilitates maintaining a desired charging or discharging state of energy storage device 208. Further, in operation of the exemplary embodiment, bypass switch controller 368 is configured to transmit control signal 370 to close bypass switch 360 when at least one BIICM state has a first predetermined value, and open bypass switch 360 when the at least one BIICM state has a second predetermined value different from the first predetermined value.

Figure 4:
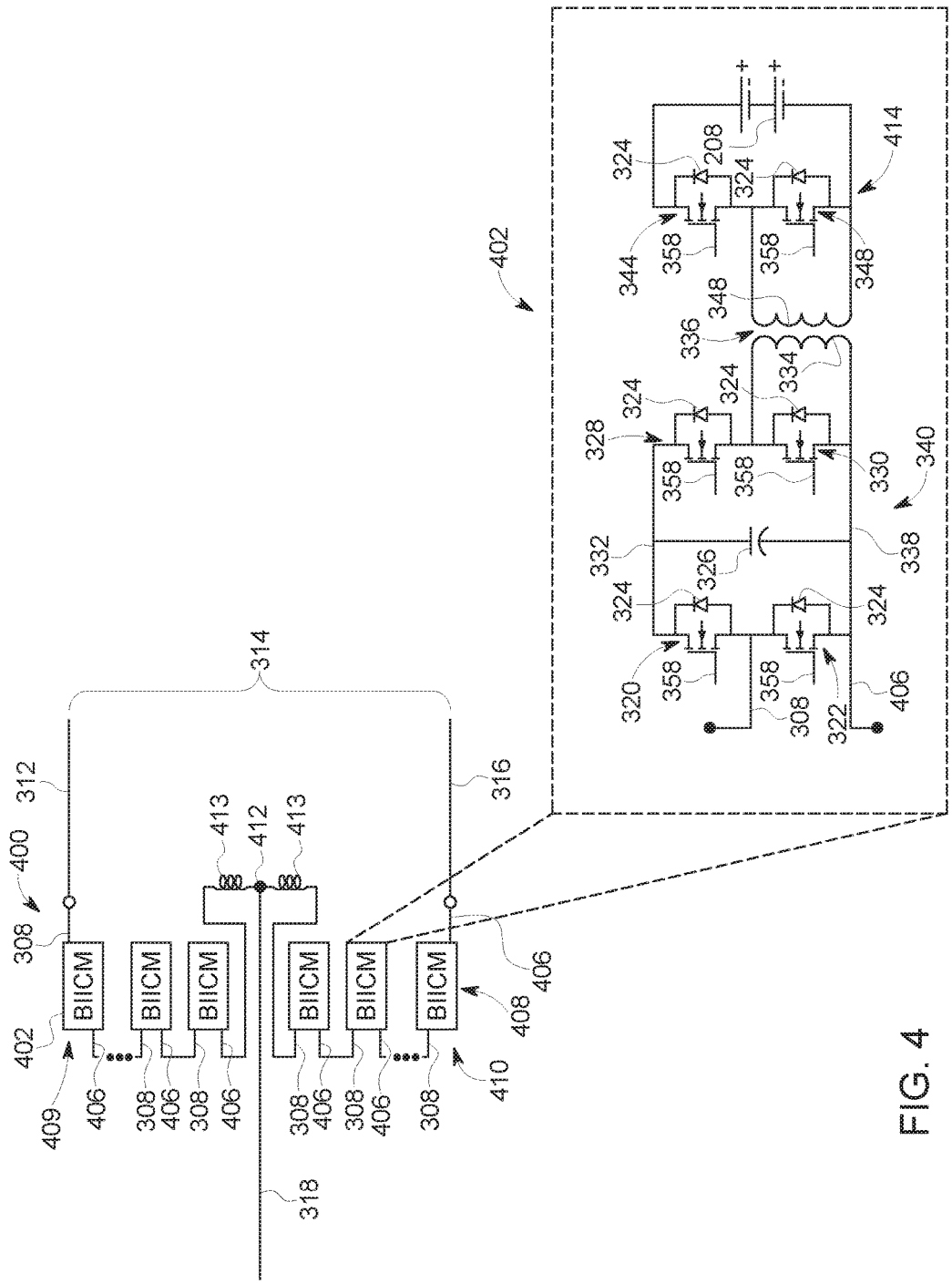
FIG. 4 is a schematic diagram of an alternative bi-directional AC-to-DC BIIC that may be used in the electric vehicle propulsion system shown in FIG. 2.

FIG. 4 is a schematic diagram of an alternative bi-directional AC-to-DC BIIC 400 that may be used in the electric vehicle propulsion system 200 shown in FIG. 2. In the alternative embodiment, bi-directional AC-to-DC BIIC 400 includes at least one bi-directional AC-to-DC BIICM 402 including a first node 308 and a second terminal 406. Second terminal 406 is equivalent to third node 338. Also, in the alternative embodiment, a plurality of bi-directional AC-to-DC BIICMs 402 are arranged in at least one BIICM string 408. First node 308 of a first bi-directional AC-to-DC BIICM 402 of BIICM string 408, i.e., the topmost bi-directional AC-to-DC BIICM 402 (topmost BIICM 409) in FIG. 4, couples to first DC line 312 of high voltage DC link 314. Second terminal 406 of a last bi-directional AC-to-DC BIICM 402 of BIICM string 408, i.e., the bottommost bi-directional AC-to-DC BIICM 402 (bottommost BIICM 410) in FIG. 4, couples to second DC line 316 of high voltage DC link 314.

Further, in the alternative embodiment, first node 308 and second terminal 406 of each bi-directional AC-to-DC BIICM 402 of BIICM string 408, other than the first BIICM 402 and second BIICM 402, respectively, are serially coupled. Furthermore, in the alternative embodiment, a phase of AC power is received to or transmitted from bi-directional AC-to-DC BIIC 400 on first AC line 318 at a power terminal 412. First AC line 318 includes BIIC cable 210 as shown and described with reference to FIGS. 3-5. In other alternative embodiments shown and described below, first AC line 318 also includes AC type generator cable 204.

Moreover, in the alternative embodiment, bi-directional AC-to-DC BIIC 400 includes at least one inductor 413 coupled to and between power terminal 412 and BIICMs 402 adjacent power terminal 412. In other alternative embodiments, not shown, bi-directional AC-to-DC BIIC 400 does not include at least one inductor 413.

Furthermore, in the alternative embodiment, bi-directional AC-to-DC BIICM 402 that may be used in bi-directional AC-to-DC BIIC 400 includes first node 308 coupled to and between first switching device 320 and second switching device 322. First switching device 320 is serially coupled to second switching device 322. Further, in the exemplary embodiment, second terminal 406 is coupled to third node 338 of first side 340. Otherwise, first side 340 of bi-directional AC-to-DC BIICM 402 is as shown and described above with reference to FIG. 3. Furthermore, in the alternative embodiment, bi-directional AC-to-DC BIICM 402 also includes a secondary side 414, i.e., a second BIICM circuit. Secondary side 414 includes fifth switching device 344 serially coupled to sixth switching device 346. Second winding 348 of BIICM high-frequency transformer 336 is coupled in parallel to sixth switching device 346. In an alternative embodiment, not shown, second winding 348 is coupled is parallel to fifth switching device 344. At least one energy storage device 208 is coupled in parallel across both of fifth switching device 344 and sixth switching device 346. In an alternative embodiment, not shown, energy storage device 208 and capacitor 326 are swapped in bi-directional AC-to-DC BIICM 402. Moreover, in the alternative embodiment, first side 340 and secondary side 414 are inductively coupled through BIICM high-frequency transformer 336.

Moreover, in the exemplary embodiment, first 320, second 322, third 328, fourth 330, fifth 344, and sixth 346 switching devices include at least one switch control terminal 358 coupled to at least one switching controller, not shown in FIG. 4. Switching controller is configured to transmit at least one switch control signal to at least one of first 320, second 322, third 328, fourth 330, fifth 344, and sixth 346 switching devices to control its switching states. In other alternative embodiments, not shown, switching controller receives and transmits other control signals to and from other controllers located elsewhere within or outside bi-directional AC-to-DC BIIC 400, also not shown in FIG. 4. In still other embodiments, not shown, bi-directional AC-to-DC BIICM 402 also includes at least one bypass switch 360 coupled to and between first node 308 and second terminal 406, and further coupled to bypass switch controller 368 and controlled thereby, substantially as shown and described above with reference to FIG. 3.

In operation, in the alternative embodiment, a phase of an AC power is transmitted to or received from first AC line 318 through power terminal 412 to/from each of the plurality of bi-directional AC-to-DC BIICMs 402 of BIICM string 408 above and below power terminal 412. Also, in operation of the alternative embodiment, first node 308 of first bi-directional AC-to-DC BIICM 402 of BIICM string 408, i.e., the topmost bi-directional AC-to-DC BIICM 402 in FIG. 4, transmits or receives DC power to/from first DC line 312. Second terminal 406 of last bi-directional AC-to-DC BIICM 402 of BIICM string 408, i.e., the bottommost bi-directional AC-to-DC BIICM 402 in FIG. 4, transmits or receives DC power to/from second DC line 314. Further, in operation of the alternative embodiment, bi-directional AC-to-DC BIIC 400 converts AC power received on first AC line 318 into DC power transmitted on high voltage DC link 314 to electrical device 122, not shown. Bi-directional AC-to-DC BIIC 402 is also capable to convert DC power received on high voltage DC link 314 into AC power transmitted on first AC line 318 to electrical device 122, not shown. Thus, in the exemplary embodiment, bi-directional AC-to-DC BIIC 400 functions as bi-directional AC-to-DC BIIC 400.

Also, in operation of the alternative embodiment, bi-directional AC-to-DC BIICM 302 converts a phase of AC power received on first node 308 and second terminal 406 into DC power transmitted to electrical device 122, not shown, on first node 308 of first bi-directional AC-to-DC BIICM 402 of BIICM string 408 and second terminal 406 of last bi-directional AC-to-DC BIICM 402 of BIICM string 408, i.e., the topmost and the bottommost bi-directional AC-to-DC BIICMs 402 in FIG. 4, respectively. Depending on a predetermined configuration of switching controllers and switching states, it is possible to divert a portion of DC power converted by secondary side 414 into energy storage device 208 to, for example, charge it. Also, in operation of the alternative embodiment, it is possible to divert a portion of DC power stored in energy storage device 208, i.e., to discharge it, to supplement DC power transmitted on first node 308 of first bi-directional AC-to-DC BIICM 402 and second terminal 406 of last bi-directional AC-to-DC BIICM 402 of BIICM string 408, i.e., the topmost and the bottommost bi-directional AC-to-DC BIICMs 402 in FIG. 4, respectively. Bi-directional AC-to-DC BIICM 402 is also capable to convert DC power received on first node 308 of first bi-directional AC-to-DC BIICM 402 and second terminal 406 of last bi-directional AC-to-DC BIICM 402 of BIICM string 408, i.e., the topmost and the bottommost bi-directional AC-to-DC BIICMs 402 in FIG. 4, respectively, into AC power transmitted from power terminal 412 to first AC line 318. Thus, in the exemplary embodiment, each module of bi-directional AC-to-DC BIIC 400, not shown, functions as bi-directional AC-to-DC BIICM 402.

Further, in operation of the exemplary embodiment, the flow of at least one of an AC current and a DC current in the switching devices of both first side 340 and secondary side 414 is controlled through at least one switch control signal transmitted from at least one switching controller to the switching devices. As such, switching controller, along with the other aforementioned features and functions of bi-directional AC-to-DC BIICM 402, facilitates maintaining a desired charging or discharging state of energy storage device 208.

Figure 5:
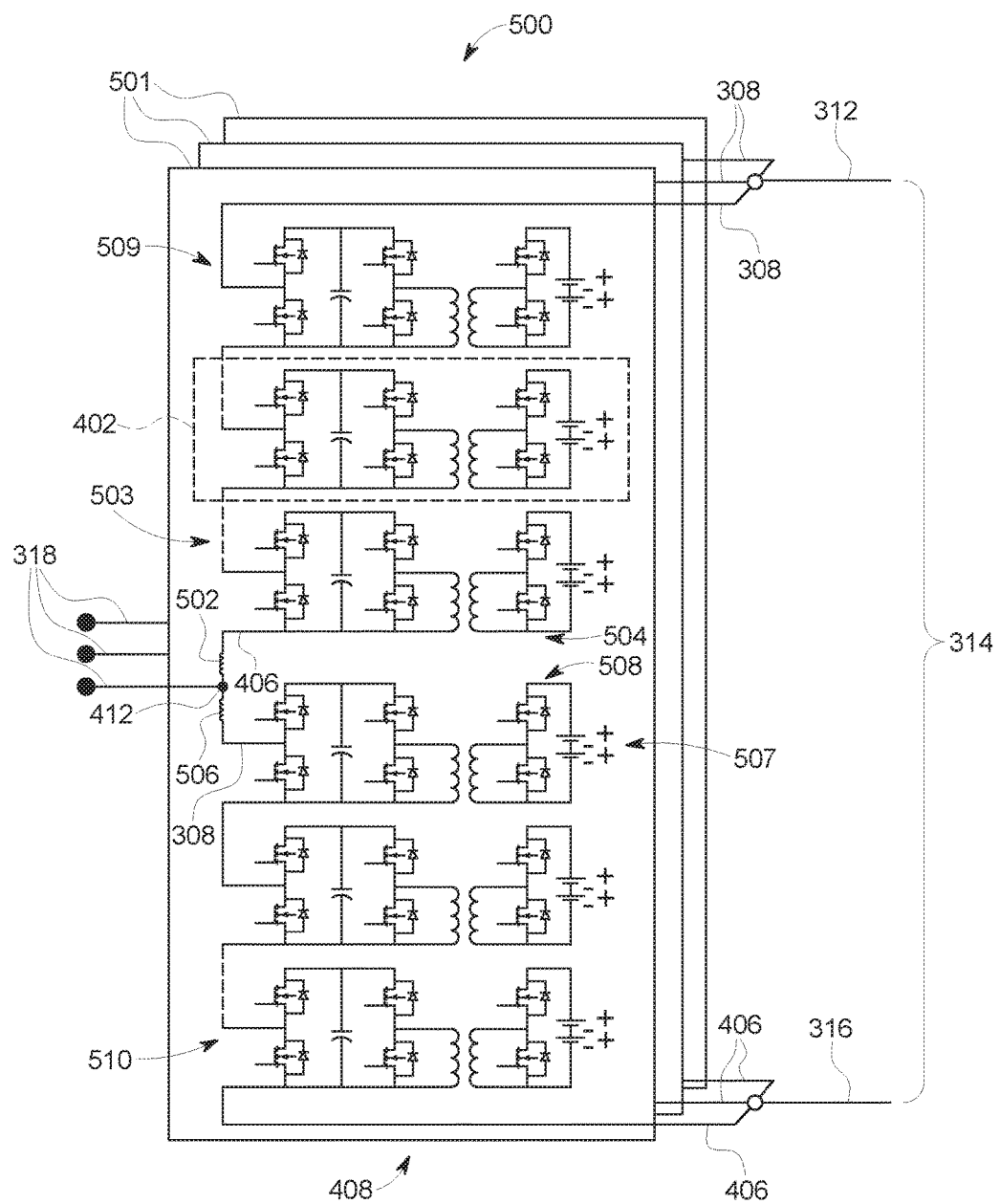
FIG. 5 is a schematic diagram of an alternative bi-directional AC-to-DC BIIC configured for 3-phase AC power conversion.

FIG. 5 is a schematic diagram of an alternative bi-directional AC-to-DC BIIC 500 configured for 3-phase AC power conversion. In the alternative embodiment, bi-directional AC-to-DC BIIC 500 includes three bi-directional AC-to-DC BIICs 400, i.e., three bi-directional AC-to-DC BIIC panels 501. Each bi-directional AC-to-DC BIIC panel 501 of the three bi-directional AC-to-DC BIIC panels 501 includes one BIICM string 408 including a plurality bi-directional AC-to-DC BIICMs 402 serially coupled above and below power terminal 412. Also, in the alternative embodiment, each bi-directional AC-to-DC BIIC panel 501 of the three bi-directional AC-to-DC BIIC panels 501 includes at least one first inductor 502 coupled to and between power terminal 412 and second terminal 406, i.e., third node 338, of a first bottommost bi-directional AC-to-DC BIICM 402 (first bottommost BIICM 503) of a first half string 504 of BIICM string 408. Each bi-directional AC-to-DC BIIC panel 501 of the three bi-directional AC-to-DC BIIC panels 501 also includes at least one second inductor 506 coupled to and between power terminal 412 and first node 308 of a second topmost bi-directional AC-to-DC BIICM 402 (second topmost BIICM 507) of a second half string 508 of BIICM string 408. In other alternative embodiments, not shown, bi-directional AC-to-DC BIIC 500 does not include at least one first inductor 502 and at least one second inductor 506.

Also, in the alternative embodiment, bi-directional AC-to-DC BIIC 500 includes three power terminals 412, one power terminal 412 on each bi-directional AC-to-DC BIIC panel 501 of the three bi-directional AC-to-DC BIIC panels 501. Each power terminal 412 is configured to transmit and/or receive at least one phase of a 3-phase AC power to/from first AC line 318. Further, in the alternative embodiment, each first node 308 of a first topmost bi-directional AC-to-DC BIICM 402 (first topmost BIICM 509) of first half string 504 of each bi-directional AC-to-DC BIIC panel 501 of the three bi-directional AC-to-DC BIIC panels 501 couples to first DC line 312. Likewise, each second terminal 406 of a second bottommost bi-directional AC-to-DC BIICM 402 (second bottommost BIICM 510) of second half string 508 of each bi-directional AC-to-DC BIIC panel 501 of the three bi-directional AC-to-DC BIIC panels 501 couples to second DC line 316. Furthermore, in the alternative embodiment, first DC line 312 and second DC line 316 together form high voltage DC link 314. Moreover, in the alternative embodiment, in first string 504 of each bi-directional AC-to-DC BIIC panel 501 of the three bi-directional AC-to-DC BIIC panels 501, first nodes 308 of all BIICMs other than first node 308 of first topmost BIICM 509 are serially coupled to third nodes 338 of all BIICMs other than third node 338 of first bottommost BIICM 503. Also, in the alternative embodiment, in second half string 508 of each bi-directional AC-to-DC BIIC panel 501 of the three bi-directional AC-to-DC BIIC panels 501, first nodes 308 of all BIICMs other than first node 308 of second topmost BIICM 507 are serially coupled to third nodes 338 of all BIICMs other than third node 338 of second bottommost BIICM 510.

In operation, in the alternative embodiment, a phase of 3-phase AC power is transmitted to or received from bi-directional AC-to-DC BIIC 500 on three first AC lines 318 through power terminals 412 on each bi-directional AC-to-DC BIIC panel 501 of the three bi-directional AC-to-DC BIIC panels 501. Also, in operation of the alternative embodiment, each first node 308 of first topmost BIICM 509 of first string 504 of each bi-directional AC-to-DC BIIC panel 501 of the three bi-directional AC-to-DC BIIC panels 501 transmits or receives DC power to/from first DC line 312. Likewise, each second terminal 406 of second bottommost BIICM 510 of second half string 508 of each bi-directional AC-to-DC BIIC panel 501 of the three bi-directional AC-to-DC BIIC panels 501 transmits or receives DC power to/from second DC line 316. Further, in operation of the alternative embodiment, bi-directional AC-to-DC BIIC 500 converts 3-phase AC power received on first AC lines 318 into DC power transmitted on high voltage DC link 314 to electrical device 122, not shown. Bi-directional AC-to-DC BIIC 500 is also capable to convert DC power received on high voltage DC link 314 into AC power transmitted on first AC lines 318 to electrical device 122, not shown. Thus, in the exemplary embodiment, bi-directional AC-to-DC BIIC 500 functions as a bi-directional AC-to-DC converter configured for 3-phase AC power.

Also, in operation of the alternative embodiment, depending on a predetermined configuration of switching controllers and switching states, it is possible to divert a portion of AC and/or DC power converted by bi-directional AC-to-DC BIIC 500 into energy storage device 208, not shown, i.e., to charge it. Also, in operation of the alternative embodiment, it is possible to divert a portion of AC and/or DC power stored in energy storage device 208, i.e., to discharge it, to supplement DC power transmitted by bi-directional AC-to-DC BIIC 500 on high voltage DC link 314. Further, in operation of the exemplary embodiment, the flow of at least one of an AC current and a DC current in the switching devices of both first side 340 and secondary side 414 is controlled through at least one switch control signal transmitted from at least one switching controller, not shown, to the switching devices of each bi-directional AC-to-DC BIICM 402 of the plurality of bi-directional AC-to-DC BIICMs 402. As such, switching controller, along with the other aforementioned features and functions of each bi-directional AC-to-DC BIIC 500, facilitates maintaining a desired charging or discharging state of at least one energy storage device 208.

Figure 6:
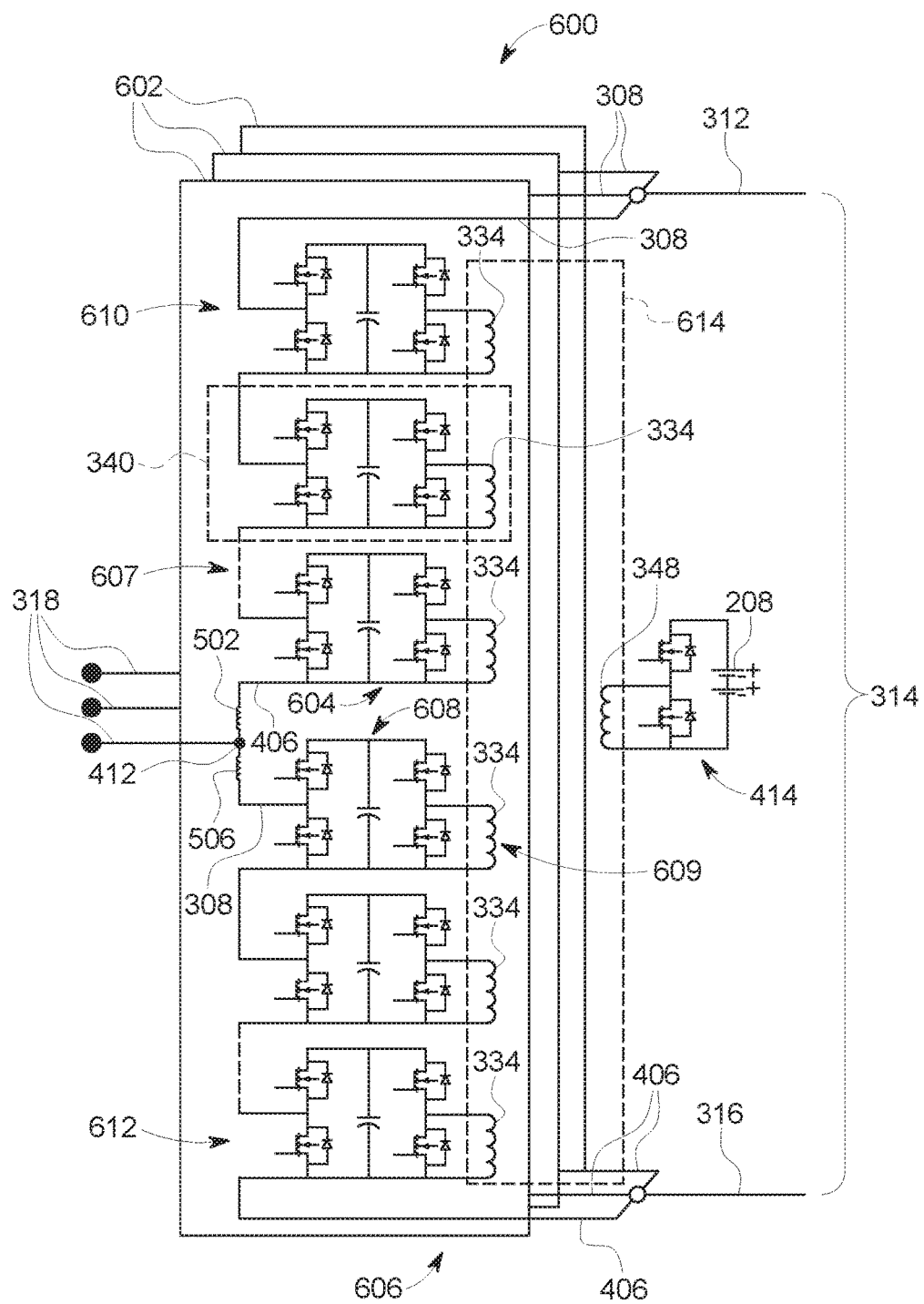
FIG. 6 is a schematic diagram of another alternative bi-directional AC-to-DC BIIC configured for 3-phase AC power conversion.

FIG. 6 is a schematic diagram of another alternative bi-directional AC-to-DC BIIC 600 configured for 3-phase AC power conversion. In the alternative embodiment, bi-directional AC-to-DC BIIC 600 includes three bi-directional AC-to-DC BIIC panels 602. Each bi-directional AC-to-DC BIIC panel 602 of the three bi-directional AC-to-DC BIIC panels 602 includes a plurality of first sides 340, i.e., first sides 340 of bi-directional AC-to-DC BIICM 402, not shown, serially coupled above and below power terminal 412. Also, in the alternative embodiment, each bi-directional AC-to-DC BIIC panel 602 of the three bi-directional AC-to-DC BIIC panels 602 includes at least one first inductor 502 coupled to and between power terminal 412 and second terminal 406 of an initial first side 340 of a first string half 604 of a strand 606, i.e., a first bottommost first side 607 of first string half 604 in FIG. 6. Each bi-directional AC-to-DC BIIC panel 602 of the three bi-directional AC-to-DC BIIC panels 602 also includes at least one second inductor 506 coupled to and between power terminal 412 and first node 308 of an initial first side 340 of a second string half 608 of strand 606, i.e., a second topmost first side 609 of second string half 608 in FIG. 6. In other alternative embodiments, not shown, bi-directional AC-to-DC BIIC 600 does not include at least one first inductor 502 and at least one second inductor 506.

Also, in the alternative embodiment, bi-directional AC-to-DC BIIC 600 includes three power terminals 412, one power terminal 412 on each bi-directional AC-to-DC BIIC panel 602 of the three bi-directional AC-to-DC BIIC panels 602. Each power terminal 412 is configured to transmit and/or receive at least one phase of a 3-phase AC power to/from first AC line 318. Further, in the alternative embodiment, each first node 308 of initial first side 340 of strand 606, i.e., a first topmost first side 610 in FIG. 6, of each bi-directional AC-to-DC BIIC panel 602 of the three bi-directional AC-to-DC BIIC panels 602 couples to first DC line 312. Likewise, each second terminal 406 of a final first side 340 of strand 606, i.e., a second bottommost first side 612 in FIG. 6, of each bi-directional AC-to-DC BIIC panel 602 of the three bi-directional AC-to-DC BIIC panels 602 couples to second DC line 316. Furthermore, in the alternative embodiment, first DC line 312 and second DC line 316 together form high voltage DC link 314.

Further, in the alternative embodiment, bi-directional AC-to-DC BIIC 600 includes at least one, but less than a total number of first sides 340, of secondary sides 414 inductively coupled to at least one first side 340 of the plurality of first sides 340 in at least one bi-directional AC-to-DC BIIC panel 602 of the three bi-directional AC-to-DC BIIC panels 602. As such, in the alternative embodiment, a multi-winding BIICM high-frequency transformer 614 includes at least one first winding 334 of at least one first side 340 and at least one second winding 348 of at least one secondary side 414. Multi-winding BIICM high-frequency transformer 614 includes, without limitation, a high-frequency multi-winding transformer configured to operate at frequencies from kHz to MHz range. Furthermore, in the alternative embodiment, at least one secondary side 414 is coupled to bi-directional AC-to-DC BIIC 600. In other alternative embodiments, not shown, at least one secondary side 414 is not coupled to bi-directional AC-to-DC BIIC 600, but is, nevertheless, inductively coupled to at least one first winding 334 therein.

In operation, in the alternative embodiment, a phase of 3-phase AC power is transmitted to or received from bi-directional AC-to-DC BIIC 600 on three first AC lines 318 through power terminals 412 on each bi-directional AC-to-DC BIIC panel 602 of the three bi-directional AC-to-DC BIIC panels 602. Also, in operation of the alternative embodiment, each first node 308 of initial first side 340 of strand 606, i.e., first topmost first sides 610, of each bi-directional AC-to-DC BIIC panel 602 of the three bi-directional AC-to-DC BIIC panels 602, transmits or receives DC power to/from first DC line 312. Likewise, each second terminal 406 of final first side 340 of strand 606, i.e., second bottommost first sides 612, in FIG. 6, of each bi-directional AC-to-DC BIIC panel 602 of the three bi-directional AC-to-DC BIIC panels 602 transmits or receives DC power to/from second DC line 316. Further, in operation of the alternative embodiment, bi-directional AC-to-DC BIIC 600 converts 3-phase AC power received on first AC lines 318 into DC power transmitted on high voltage DC link 314 to electrical device 122, not shown. Bi-directional AC-to-DC BIIC 600 is also capable to convert DC power received on high voltage DC link 314 into AC power transmitted on first AC lines 318 to electrical device 122, not shown. Thus, in the exemplary embodiment, bi-directional AC-to-DC BIIC 600 functions as a bi-directional AC-to-DC converter configured for 3-phase AC power.

Also, in operation of the alternative embodiment, depending on a predetermined configuration of switching controllers and switching states, it is possible to divert a portion of AC and/or DC power converted by bi-directional AC-to-DC BIIC 600 into energy storage device 208, i.e., to charge it. Also, in operation of the alternative embodiment, it is possible to divert a portion of DC power stored in energy storage device 208, i.e., to discharge it, to supplement DC power transmitted by bi-directional AC-to-DC BIIC 600 on high voltage DC link 314. Further, in operation of the exemplary embodiment, the flow of at least one of an AC current and a DC current in the switching devices of both first side 340 and secondary side 414 is controlled through at least one switch control signal transmitted from at least one switching controller, not shown, to the switching devices of each first side 340 and each secondary side 414 in bi-directional AC-to-DC BIIC 600. Furthermore, in operation of the alternative embodiment, multi-winding BIICM high-frequency transformer 614 enables a single energy storage device 208 to share power with each first side 340 of the plurality of first sides 340 of bi-directional AC-to-DC BIIC 600. Multi-winding BIICM high-frequency transformer 614 also facilitates adjusting the number of secondary sides 414 depending on the particular applications required by electric vehicle propulsion systems, including, without limitation, electric vehicle propulsion system 200. As such, switching controller, along with the other aforementioned features and functions of bi-directional AC-to-DC BIIC 600, facilitates maintaining a desired charging or discharging state of energy storage device 208.

Figure 7:
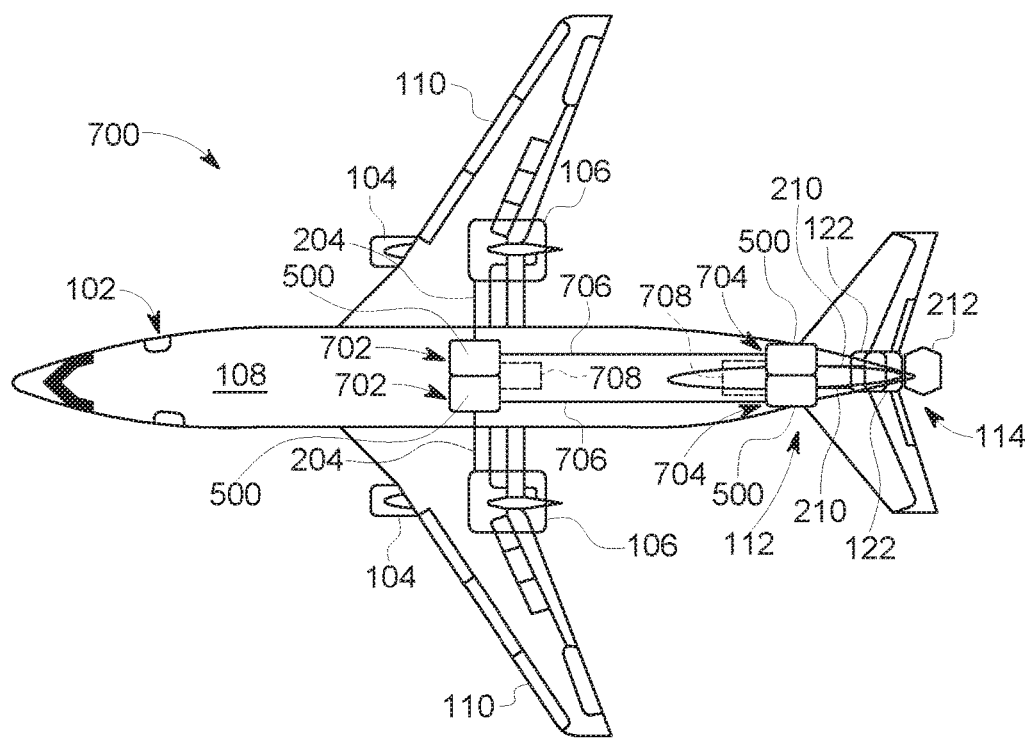
FIG. 7 is a schematic view of an alternative embodiment of an electric vehicle propulsion system superimposed on a plan view of an aircraft.

FIG. 7 is a schematic view of an alternative embodiment of an electric vehicle propulsion system 700 superimposed on a plan view of an aircraft. In the alternative embodiment, vehicle 102 is an aircraft, as shown as described above with reference to FIG. 1. Also, in the alternative embodiment, generator 106 is coupled to drive engine 104 of vehicle 102 and to AC type generator cable 204. Further, in the alternative embodiment, drive engine 104 is configured as a prime mover for generator 106, and generator 106 is configured to induce a 3-phase AC power output transmitted on generator cable 204. Generator cable 204 is coupled to and between generator 106 and at least one first converter set 702 including at least one bi-directional AC-to-DC BIIC 500, i.e., a fore BIIC. Moreover, in the alternative embodiment, first converter set 702 is located in fuselage 108 proximate wing 110. In other alternative embodiments, not shown, first converter set 702 includes at least one bi-directional AC-to-DC BIIC 600.

Also, in the alternative embodiment, electric vehicle propulsion system 700 includes at least one second converter set 704. Second converter set 704 includes at least one bi-directional AC-to-DC BIIC 500, i.e., an aft BIIC. Further, in the alternative embodiment, second converter set 704 is located in aft portion 112 proximate tail 114. In other alternative embodiments, not shown, second converter set 704 includes at least one bi-directional AC-to-DC BIIC 500. Furthermore, in the alternative embodiment, at least one BIIC-to-BIIC cable 706 of a DC type is coupled to and between first converter set 702 and second converter set 704. As shown and described above with reference to FIGS. 4 and 5, bi-directional AC-to-DC BIIC 500 of first converter set 702 is configured to function as an AC-to-DC power converter which receives AC power from generator 106 and transmits DC power to second converter set 704 on BIIC-to-BIIC cable 706. Moreover, in the alternative embodiment, bi-directional AC-to-DC BIIC 500 of second converter set 704 is configured to function as a DC-to-AC power converter which receives DC power from first converter set 702 and transmits AC power to electrical device 122 on AC type BIIC cable 210. Electrical device 122 includes fan motor 212 used for vehicle propulsion, including, without limitation, during taxiing on a runway, i.e., where vehicle 102 is an aircraft.

Further, in the alternative embodiment, in cases where a DC interconnect 708 is coupled to and between at least two first converter sets 702, a first DC bus, not shown, is coupled to and between first DC line 312 of a first bi-directional AC-to-DC BIIC 500 and a second bi-directional AC-to-DC BIIC 500. Likewise, a second DC bus, not shown, is coupled to and between second DC line 316 of first bi-directional AC-to-DC BIIC 500 and second bi-directional AC-to-DC BIIC 500. Together, first DC bus and second DC bus form DC interconnect 708. Similarly, in cases where DC interconnect 708 is coupled to and between at least two second converter sets 704, first DC bus, not shown, is coupled to and between first DC line 312 of a first bi-directional AC-to-DC BIIC 500 and a second bi-directional AC-to-DC BIIC 500. Likewise, a second DC bus, not shown, is coupled to and between second DC line 316 of first bi-directional AC-to-DC BIIC 500 and second bi-directional AC-to-DC BIIC 500. Including DC interconnect 708 facilitates balancing or sharing the power received and/or transmitted by each first converter set 702 of at least two first converter sets 702 from generator 106 and/or to second converter set 704, respectively. Similarly, including DC interconnect 708 facilitates balancing or sharing the power received and/or transmitted by each second converter set 704 of at least two second converter sets 704 to first converter set 702 and/or to electrical device 122, respectively.

In operation of the alternative embodiment, AC power from generator 106 is converted by first converter set 702 into DC power transmitted to second converter set 704 on an BIIC-to-BIIC cable 706. Also, in operation of the alternative embodiment, it is possible for first converter set 702 to divert at least a portion of AC and/or DC power to charge energy storage device 208, not shown, in bi-directional AC-to-DC BIIC 500. It is also possible for first converter set 702 to discharge energy storage device 208 to supply at least a portion of DC power transmitted on BIIC-to-BIIC cable 706 to second converter set 704. Further, in operation of the exemplary embodiment, inclusion of first converter set 702 and second converter set 704 facilitates coupling of DC cable, rather than larger and heavier AC cable, between generator 106 and electrical device 122, thus increasing the specific power, i.e., kW/kg, of the exemplary electric vehicle propulsion system 700 relative to the electric vehicle propulsion system 100 shown and described above with reference to FIG. 1.

Figure 8:
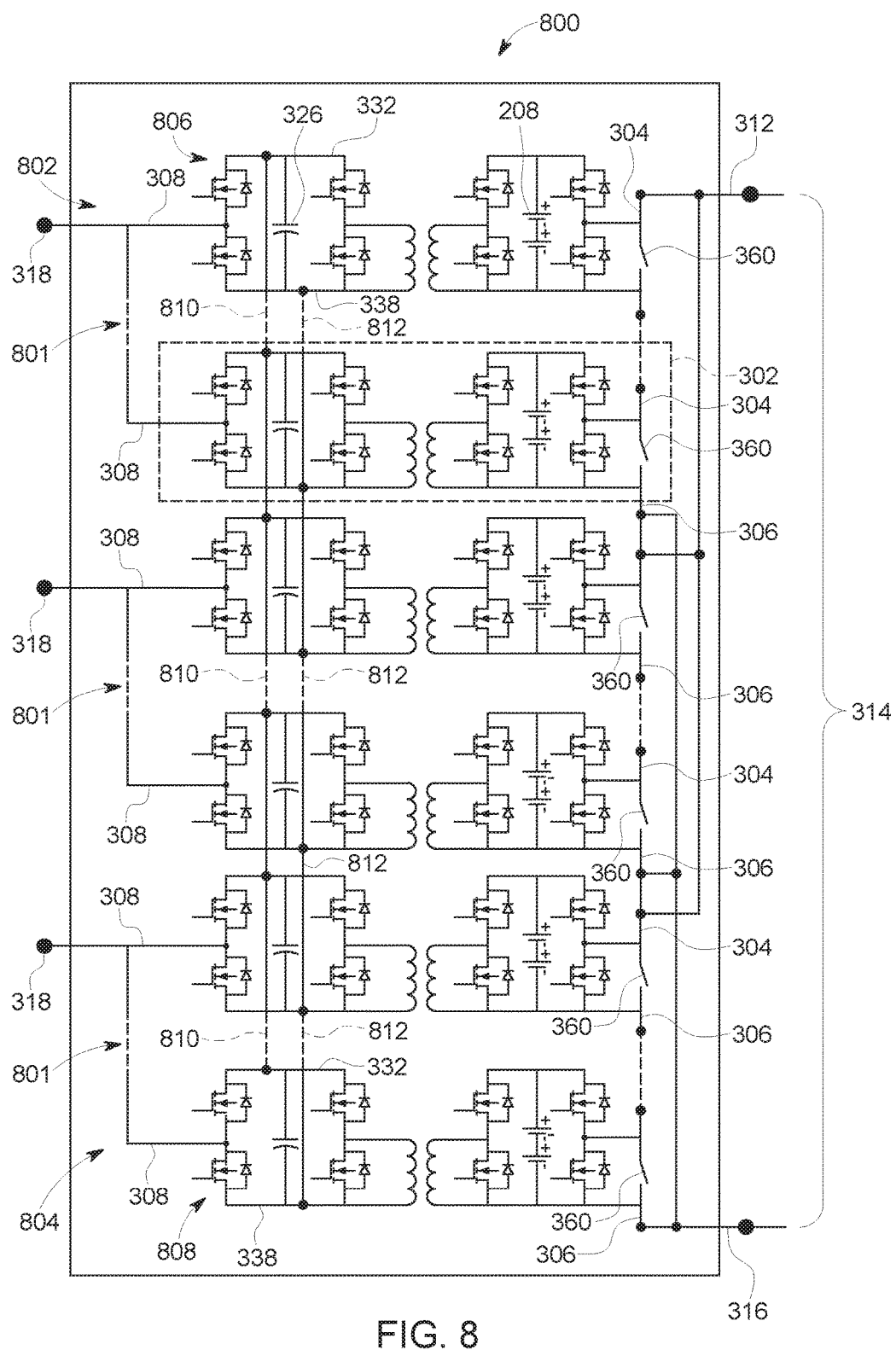
FIG. 8 is a schematic diagram of another alternative bi-directional AC-to-DC BIIC configured for 3-phase AC power conversion.

FIG. 8 is a schematic diagram of another alternative bi-directional AC-to-DC BIIC 800 configured for 3-phase AC power conversion. In the alternative embodiment, bi-directional AC-to-DC BIIC 800 includes at least three BIICM sets 801 of at least one bi-directional AC-to-DC BIICM 302. The at least three BIICM sets 801 includes a topmost BIICM set 802 and a bottommost BIICM set 804. Also, in the alternative embodiment, each BIICM set 801 of the three BIICM sets 801 in bi-directional AC-to-DC BIIC 800 includes a plurality of bi-directional AC-to-DC BIICMs 302. Each BIICM set 801 of the at least three BIICM sets 801 also includes a topmost BIICM 806 and a bottommost BIICM 808. Each first node 308 of each bi-directional AC-to-DC BIICM 302 of each BIICM set 801 of the three BIICM sets 801 are coupled together and further coupled to one first AC line 318 of at least three first AC lines 318. Each first AC line 318 transmits a phase of a 3-phase AC power to/from each first node 308 of each bi-directional AC-to-DC BIICM 302 within each BIICM set 801 of the three BIICM sets 801 of bi-directional AC-to-DC BIICMs 302 in bi-directional AC-to-DC BIIC 800.

Also, in the alternative embodiment, all second nodes 332 of each bi-directional AC-to-DC BIICM 302 of each BIICM set 801 of the three BIICM sets 801 of bi-directional AC-to-DC BIICMs 302 in bi-directional AC-to-DC BIIC 800 are coupled together through a first nodal bus 810. Similarly, all third nodes 338 of each bi-directional AC-to-DC BIICM 302 of each BIICM set 801 of the three BIICM sets 801 of bi-directional AC-to-DC BIICMs 302 are coupled together through a second nodal bus 812. In other alternative nodes, not shown, one or both of first nodal bus 810 and second nodal bus 812 are not present in bi-directional AC-to-DC BIIC 800.

Further, in the alternative embodiment, first DC terminal 304, i.e., fifth node 372, of topmost BIICM 806 of topmost BIICM set 802 of bi-directional AC-to-DC BIIC 800 couples to first DC line 312. Likewise, second DC terminal 306, i.e., fourth node 356, of bottommost BIICM 808 of bottommost BIICM set 804 of bi-directional AC-to-DC BIIC 800 couples to second DC line 316. Furthermore, in the alternative embodiment, first DC line 312 and second DC line 316 together form high voltage DC link 314. Moreover, in the alternative embodiment, fourth nodes 356 and fifth nodes 372 of all bi-directional AC-to-DC BIICMs 302 other than topmost BIICM 806 of topmost BIICM set 802 and bottommost BIICM 808 of bottommost BIICM set 804 are serially coupled together. Also, in the alternative embodiment, each bi-directional AC-to-DC BIICM 302 of each BIICM set 801 of the three BIICM sets 801 of bi-directional AC-to-DC BIICMs 302 includes bypass switch 360, as shown and described above with reference to FIG. 3. In an alternative embodiment, not shown, bi-directional AC-to-DC BIIC 800 does not include bypass switch 360. In another alternative embodiment, not shown, positions of energy storage device 208 and capacitor 326 in bi-directional AC-to-DC BIICMs 302 are swapped in bi-directional AC-to-DC BIIC 800.

In operation, in the alternative embodiment, a phase of 3-phase AC power is transmitted to or received from bi-directional AC-to-DC BIIC 800 on three first AC lines 318 through first nodes 308 within each BIICM set 801 of the three BIICM sets 801 of bi-directional AC-to-DC BIICMs 302 in bi-directional AC-to-DC BIIC 800. Also, in operation of the alternative embodiment, first DC terminal 304 of topmost BIICM 806 of topmost BIICM set 802 of bi-directional AC-to-DC BIIC 800 transmits or receives DC power to/from first DC line 312. Likewise, second DC terminal 306 of bottommost BIICM 808 of bottommost BIICM set 804 of bi-directional AC-to-DC BIIC 800 transmits or receives DC power to/from second DC line 316. Further, in operation of the alternative embodiment, bi-directional AC-to-DC BIIC 800 converts 3-phase AC power received on first AC lines 318 into DC power transmitted on high voltage DC link 314 to electrical device 122, not shown. Bi-directional AC-to-DC BIIC 800 is also capable to convert DC power received on high voltage DC link 314 into AC power transmitted on first AC line 318 to electrical device 122, not shown. Thus, in the exemplary embodiment, bi-directional AC-to-DC BIIC 800 functions as a bi-directional AC-to-DC converter configured for 3-phase AC power.

Also, in operation of the alternative embodiment, depending on a predetermined configuration of switching controllers and switching states, it is possible to divert a portion of AC and/or DC power converted by bi-directional AC-to-DC BIIC 800 into energy storage device 208, not shown, i.e., to charge it. Also, in operation of the alternative embodiment, it is possible to divert a portion of power stored in energy storage device 208, i.e., to discharge it, to supplement AC and/or DC power transmitted by bi-directional AC-to-DC BIIC 800 on high voltage DC link 314 and/or first AC line 318. Further, in operation of the exemplary embodiment, the flow of at least one of an AC current and a DC current in the switching devices of each bi-directional AC-to-DC BIICM 302 of each BIICM set 801 of the three BIICM sets 801 of bi-directional AC-to-DC BIIC 800 is controlled through at least one switch control signal transmitted from at least one switching controller. As such, switching controller along with the other aforementioned features and functions of bi-directional AC-to-DC BIIC 800 facilitates maintaining a desired charging or discharging state of energy storage device 208.

Figure 9:
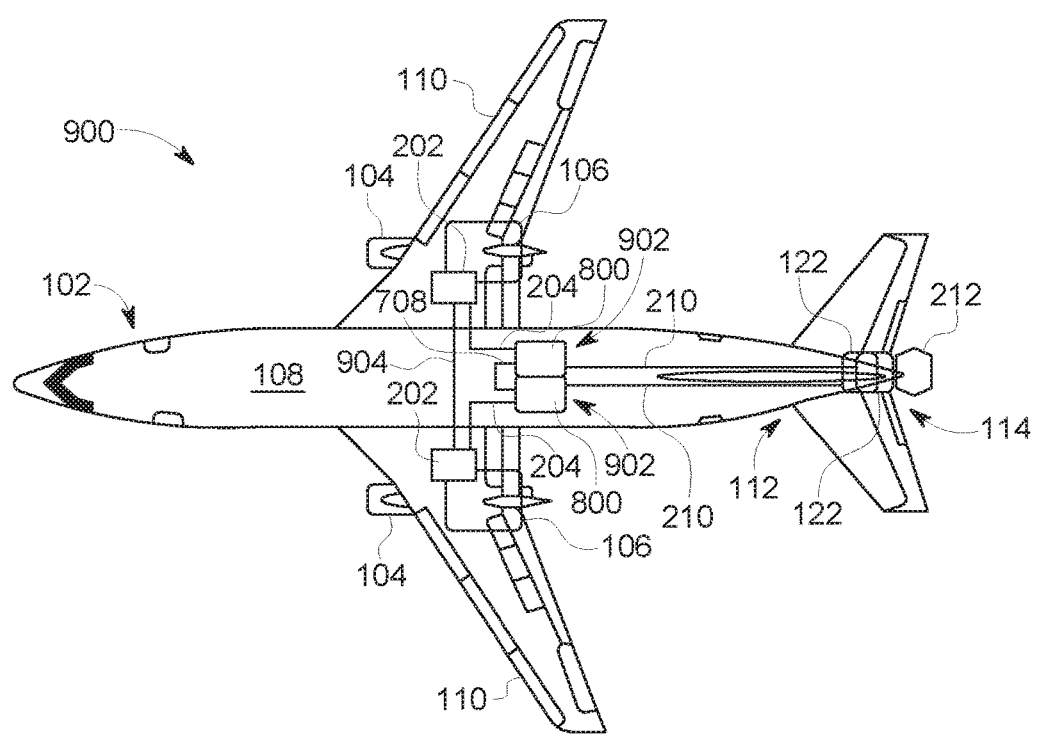
FIG. 9 is a schematic view of yet another alternative embodiment of an electric vehicle propulsion system superimposed on a plan view of an aircraft.

FIG. 9 is a schematic view of yet another alternative embodiment of an electric vehicle propulsion system 900 superimposed on a plan view of an aircraft. In the exemplary embodiment, vehicle 102 is an aircraft, as shown as described above with reference to FIG. 1. Also, in the alternative embodiment, generator 106 is coupled to drive engine 104 of vehicle 102 and to generator rectifier 202, as shown and described above with reference to FIG. 2. Generator cable 204 of a DC type is coupled to and between generator rectifier 202 and at least one converter set 902 including at least one bi-directional AC-to-DC BIIC 800.

Further, in the alternative embodiment, converter set 902 is located in fuselage 108 proximate wing 110. In other alternative embodiments, not shown, converter set 902 is located in aft portion 112 proximate tail 114. Locating converter set 902 in aft portion 112 provides enhanced specific power to electric vehicle propulsion system 900, as described above with reference to FIG. 2.

Also, in the alternative embodiment, electric vehicle propulsion system 900 includes AC type BIIC cable 210 coupled to and between converter set 902 and electrical device 122. Further, in the alternative embodiment, bi-directional AC-to-DC BIIC 800 of converter set 902 is configured to function as a DC-to-AC power converter which receives DC power from generator rectifier 202 and transmits AC power to electrical device 122 on BIIC cable 210. Furthermore, in the alternative embodiment, electrical device 122 includes fan motor 212 used for vehicle propulsion, including, without limitation, during taxiing on a runway, i.e., where vehicle 102 is an aircraft. Moreover, in the alternative embodiment, electric vehicle propulsion system 900 includes DC interconnect 708. DC interconnect 708 is coupled to and between at least two converter sets 902. DC interconnect 708 includes a first DC bus, not shown, coupled to and between first DC line 312 of a first bi-directional AC-to-DC BIIC 800 and first DC line 312 of a second bi-directional AC-to-DC BIIC 800. Likewise, DC interconnect 708 includes a second DC bus, not shown, coupled to and between second DC line 316 of first bi-directional AC-to-DC BIIC 800 and second DC line 316 of second bi-directional AC-to-DC BIIC 800. Together, first DC bus and second DC bus form DC interconnect 708. Also, in the alternative embodiment, electric vehicle propulsion system 900 includes a rectifier bus 904. Rectifier bus 904 is coupled to and between at least two generator rectifiers 202, i.e., where at least two generators 106 are coupled to vehicle 102. In other alternative embodiments, not shown, rectifier bus 904 is not present.

With the exception of added functionality provided to electric vehicle propulsion system 900 by DC interconnect 708 and rectifier bus 904, operation of the alternative embodiment and attendant benefits thereof are as described above with reference to FIG. 2. DC interconnect 708 facilitates balancing or sharing the power received and/or transmitted by each of at least two converter sets 902 from generator rectifier 202 and/or to electrical device 122, respectively. Rectifier bus 904 facilitates balancing or sharing the power generated by and/or rectified by each of at least two generators 106 and/or at least two generator rectifiers 202, respectively.

Figure 10:
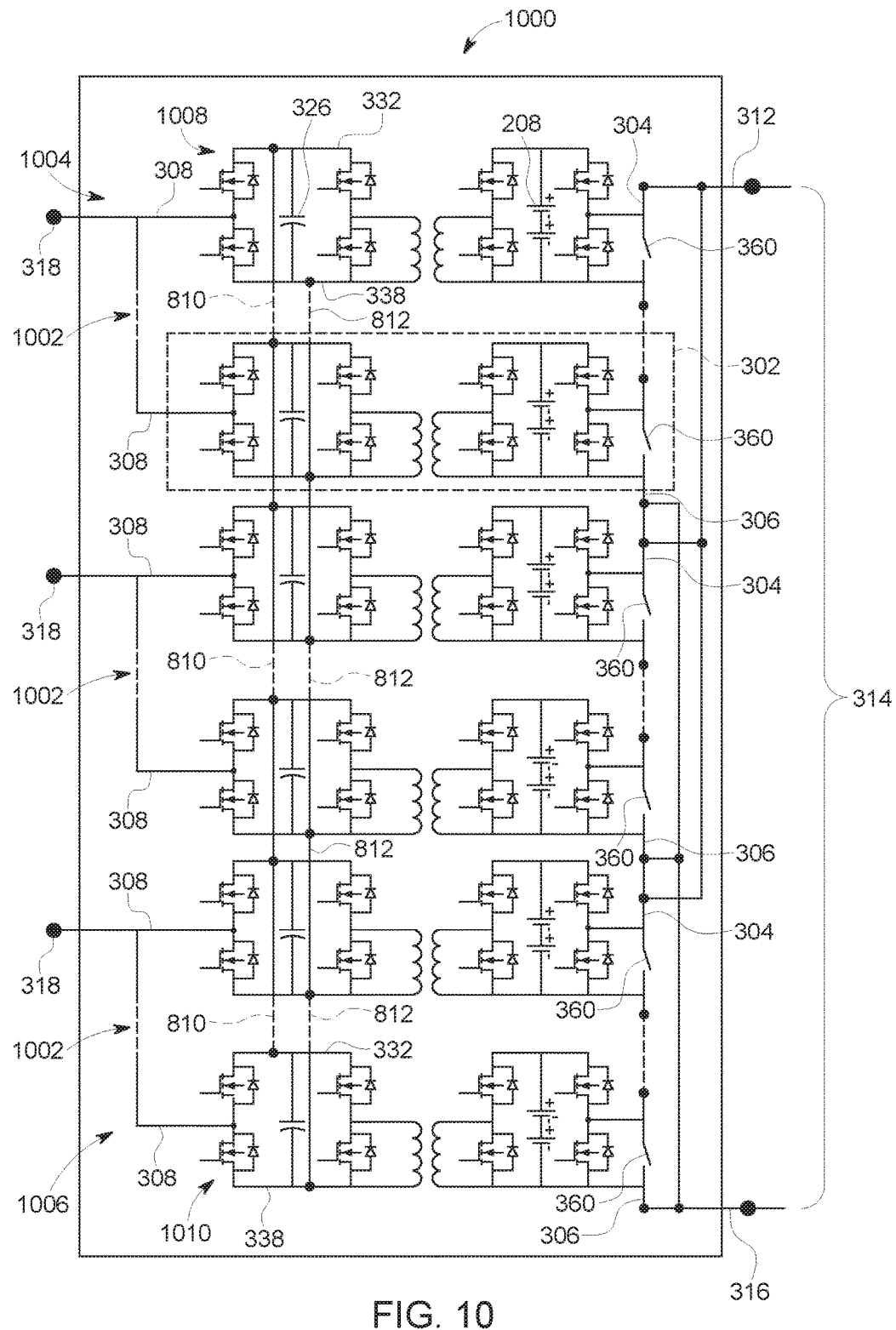
FIG. 10 is a schematic diagram of yet another alternative bi-directional AC-to-DC BIIC configured for 3-phase AC power conversion.

FIG. 10 is a schematic diagram of yet another alternative bi-directional AC-to-DC BIIC 1000 configured for 3-phase AC power conversion. In the alternative embodiment, bi-directional AC-to-DC BIIC 1000 includes at least three BIICM sets 1002 of at least one bi-directional AC-to-DC BIICM 302. The at least three BIICM sets 1002 include a topmost BIICM set 1004 and a bottommost BIICM set 1106. Also, in the alternative embodiment, each BIICM set 1002 of the three BIICM sets 1002 of bi-directional AC-to-DC BIICMs 302 in bi-directional AC-to-DC BIIC 1000 includes a plurality of bi-directional AC-to-DC BIICMs 302. Each BIICM set 1002 of the at least three BIICM sets 1002 also includes a topmost BIICM 1008 and a bottommost BIICM 1010. Each first node 308 of each bi-directional AC-to-DC BIICM 302 of each BIICM set 1002 of the three BIICM sets 1002 are coupled together and further coupled to one first AC line 318 of at least three first AC lines 318. Each first AC line 318 of the at least three first AC lines 318 transmits a phase of a 3-phase AC power to/from each first node 308 of each bi-directional AC-to-DC BIICM 302 within each BIICM set 1002 of the three BIICM sets 1002 of bi-directional AC-to-DC BIICMs 302 in bi-directional AC-to-DC BIIC 1000.

Also, in the alternative embodiment, all second nodes 332 of each bi-directional AC-to-DC BIICM 302 of each BIICM set 1002 of the three BIICM sets 1002 of bi-directional AC-to-DC BIICMs 302 in bi-directional AC-to-DC BIIC 1000 are coupled together through a first nodal bus 810. Similarly, all third nodes 338 of each bi-directional AC-to-DC BIICM 302 of each BIICM set 1002 of the three BIICM sets 1002 of bi-directional AC-to-DC BIICMs 302 are coupled together through a second nodal bus 812. In other alternative nodes, not shown, one or both of first nodal bus 810 and second nodal bus 812 are not present in bi-directional AC-to-DC BIIC 1000.

Further, in the alternative embodiment, first DC terminals 304, i.e., fifth nodes 372, of each topmost BIICM 1008 of each BIICM set 1002 of bi-directional AC-to-DC BIICMs 302 in bi-directional AC-to-DC BIIC 1000 is coupled to first DC line 312. Likewise, second DC terminal 306, i.e., fourth node 356, of each bottommost BIICM 1010 of each BIICM set 1002 of bi-directional AC-to-DC BIICMs 302 in bi-directional AC-to-DC BIIC 1000 is coupled to second DC line 316. Furthermore, in the alternative embodiment, first DC line 312 and second DC line 316 together form high voltage DC link 314. Moreover, in the alternative embodiment, fourth nodes 356 and fifth nodes 372 within each BIICM set 1002 other than the topmost BIICM 1008 and bottommost BIICM 1010 of each BIICM set 1002 are serially coupled together. Also, in the alternative embodiment, each bi-directional AC-to-DC BIICM 302 of each BIICM set 1002 of the three BIICM sets 1002 of bi-directional AC-to-DC BIICMs 302 includes at least one bypass switch 360, as shown and described above with reference to FIG. 3. In an alternative embodiment, not shown, bi-directional AC-to-DC BIIC 800 does not include at least one bypass switch 360. In another alternative embodiment, not shown, positions of energy storage device 208 and capacitor 326 in bi-directional AC-to-DC BIICMs 302 are swapped in bi-directional AC-to-DC BIIC 1000.

In operation, in the alternative embodiment, a phase of 3-phase AC power is transmitted to or received from bi-directional AC-to-DC BIIC 1000 on three first AC lines 318 through first nodes 308 within each BIICM set 1002 of the three BIICM sets 1002 of bi-directional AC-to-DC BIICMs 302 in bi-directional AC-to-DC BIIC 1000. Also, in operation of the alternative embodiment, first DC terminals 304 of each topmost BIICM 1008 of each BIICM set 1002 of bi-directional AC-to-DC BIICMs 302 in bi-directional AC-to-DC BIIC 1000 transmits or receives DC power to/from first DC line 312. Likewise, second DC terminals 306 of each bottommost BIICM 1010 of each BIICM set 1002 of bi-directional AC-to-DC BIICMs 302 in bi-directional AC-to-DC BIIC 1000 transmits or receives DC power to/from second DC line 316. Further, in operation of the alternative embodiment, bi-directional AC-to-DC BIIC 1000 converts 3-phase AC power received on first AC lines 318 into DC power transmitted on high voltage DC link 314 to electrical device 122, not shown. Bi-directional AC-to-DC BIIC 1000 is also capable to convert DC power received on high voltage DC link 314 into AC power transmitted on first AC line 318 to electrical device 122. Thus, in the exemplary embodiment, bi-directional AC-to-DC BIIC 1000 functions as a bi-directional AC-to-DC converter configured for 3-phase AC power.

Also, in operation of the alternative embodiment, depending on a predetermined configuration of switching controllers and switching states, it is possible to divert a portion of AC and/or DC power converted by bi-directional AC-to-DC BIIC 1000 into energy storage device 208, not shown, i.e., to charge it. Also, in operation of the alternative embodiment, it is possible to divert a portion of power stored in energy storage device 208, i.e., to discharge it, to supplement AC and/or DC power transmitted by bi-directional AC-to-DC BIIC 1000 on high voltage DC link 314 and/or first AC line 318. Further, in operation of the exemplary embodiment, the flow of at least one of an AC current and a DC current in the switching devices of each bi-directional AC-to-DC BIICM 302 of each BIICM set 1002 of the three BIICM sets 1002 of bi-directional AC-to-DC BIICMs 302 in bi-directional AC-to-DC BIIC 1000 is controlled through at least one switch control signal transmitted from at least one switching controller, not shown. As such, switching controller along with the other aforementioned features and functions of bi-directional AC-to-DC BIIC 1000 facilitates maintaining a desired charging or discharging state of energy storage device 208.

Figure 11:
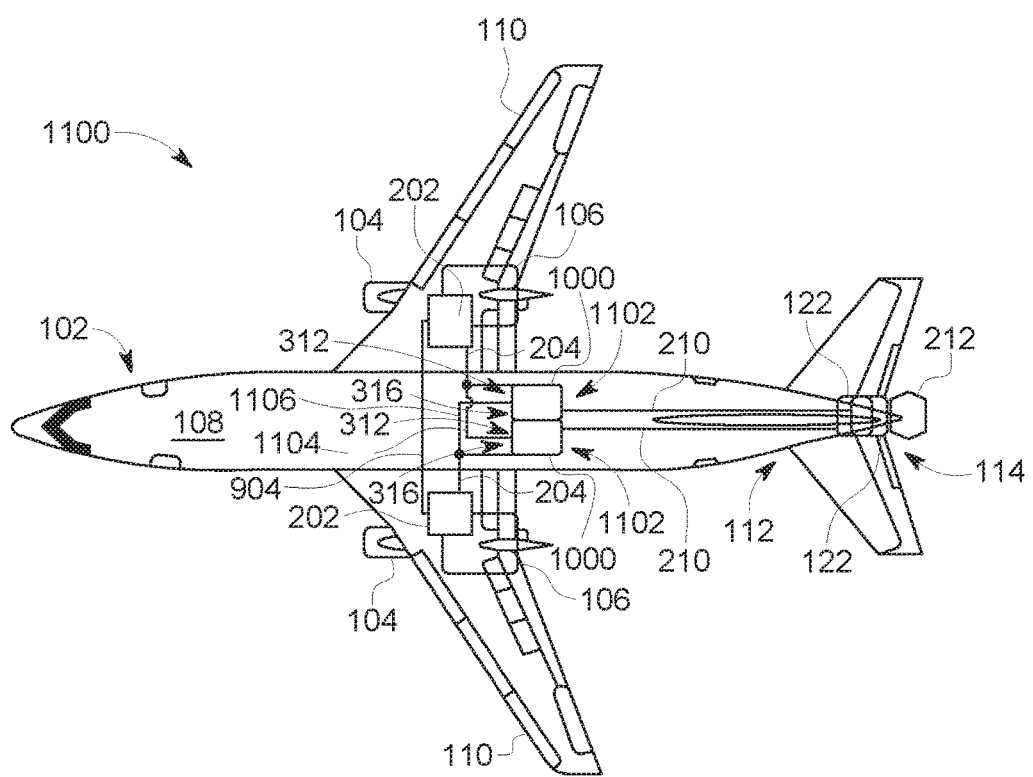
FIG. 11 is a schematic view of yet another alternative embodiment of an electric vehicle propulsion system superimposed on a plan view of an aircraft.

FIG. 11 is a schematic view of yet another alternative embodiment of an electric vehicle propulsion system 1100 superimposed on a plan view of an aircraft. In the exemplary embodiment, vehicle 102 is an aircraft, as shown as described above with reference to FIG. 1. Also, in the alternative embodiment, generator 106 is coupled to drive engine 104 of vehicle 102 and to generator rectifier 202, as shown and described above with reference to FIG. 2. Generator cable 204 of a DC type is coupled to and between generator rectifier 202 and at least one converter set 1102 including at least one bi-directional AC-to-DC BIIC 1000. Further, in the alternative embodiment, converter set 1102 is located in fuselage 108 proximate wing 110. In other alternative embodiments, not shown, converter set 1102 is located in aft portion 112 proximate tail 114. Locating converter set 1102 in aft portion 112 provides enhanced specific power to electric vehicle propulsion system 1100, as described above with reference to FIG. 2.

Also, in the alternative embodiment, electric vehicle propulsion system 1100 includes at least one BIIC cable 210 of an AC type coupled to and between converter set 1102 and electrical device 122. Further, in the alternative embodiment, bi-directional AC-to-DC BIIC 1000 of converter set 1102 is configured to function as a DC-to-AC power converter which receives DC power from generator rectifier 202 and transmits AC power to electrical device 122 on BIIC cable 210. Furthermore, in the alternative embodiment, electrical device 122 includes fan motor 212 used for vehicle propulsion, including, without limitation, during taxiing on a runway, i.e., where vehicle 102 is an aircraft. Moreover, in the alternative embodiment, electric vehicle propulsion system 1100 includes a rectifier bus 904. Rectifier bus 904 is coupled to and between at least two generator rectifiers 202, i.e., where at least two generators 106 are coupled to vehicle 102. In other alternative embodiments, not shown, rectifier bus 904 is absent.

Further, in the alternative embodiment, electric vehicle propulsion system 1100 also includes a first extension 1104 and a second extension 1106. In cases where at least two generators 106 are coupled to vehicle 102, first extension 1104 is coupled to and between generator cable 204 of a first generator rectifier 202 of at least two generator rectifiers 202 and first DC lines 312 of each bi-directional AC-to-DC BIIC 1000 of at least two converter sets 1102. Likewise, second extension 1106 is coupled to and between generator cable 204 of a second generator rectifier 202 of at least two generator rectifiers 202 and second DC lines 316 of each bi-directional AC-to-DC BIIC 1000 of at least two converter sets 1102. In other alternative embodiments, not shown, first extension 1104 and second extension 1106 are absent.

With the exception of added functionality provided to electric vehicle propulsion system 1100 by DC interconnect 708, first extension 1104, and second extension 1106, operation of the alternative embodiment and attendant benefits thereof are as described above with reference to FIG. 2. Rectifier bus 904 facilitates balancing or sharing the power generated by and/or rectified by each of at least two generators 106 and/or at least two generator rectifiers 202, respectively. First extension 1104 and second extension 1106 facilitate balancing or sharing the power received by each of at least two converter sets 1102 from each generator rectifier 202 of at least two generator rectifiers 202 of electric vehicle propulsion system 1100.

Figure 12:
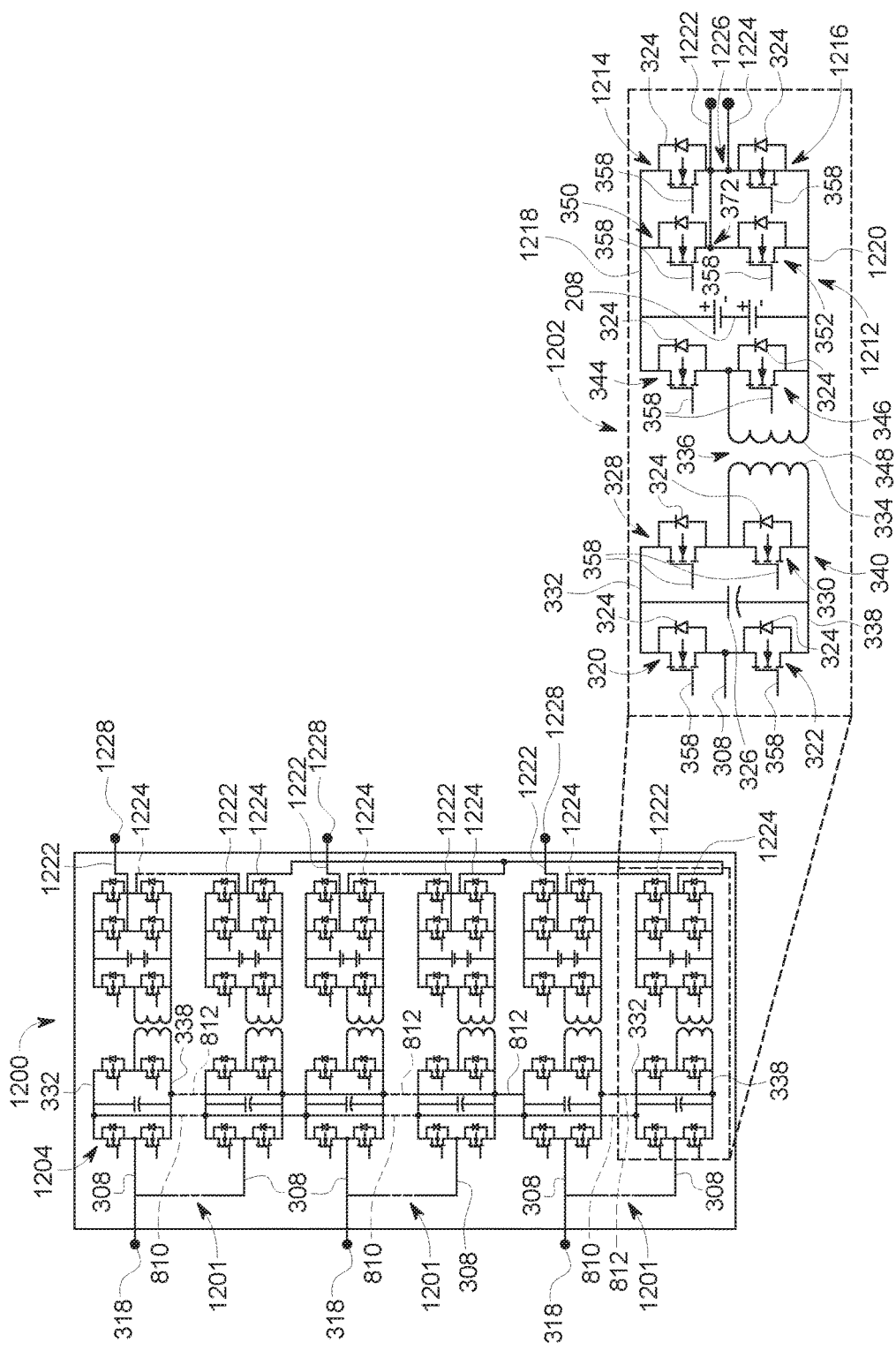
FIG. 12 is a schematic diagram of an exemplary AC-to-AC BIIC configured for 3-phase AC power conversion.

FIG. 12 is a schematic diagram of an exemplary AC-to-AC BIIC 1200 configured for 3-phase AC power conversion. In the exemplary embodiment, AC-to-AC BIIC 1200 includes at least three BIICM sets 1201 of at least one AC-to-AC BIICM 1202. The at least three BIICM sets 1201 include a topmost BIICM set 1204 and a bottommost BIICM set 1206. Also, in the alternative embodiment, each BIICM set 1201 of the three BIICM sets 1201 of at least one AC-to-AC BIICM 1202 in AC-to-AC BIIC 1200 includes a plurality of AC-to-AC BIICMs 1202. Each BIICM set 1201 of the at least three BIICM sets 1201 also includes a topmost BIICM 1208 and a bottommost BIICM 1210. Further, in the exemplary embodiment, each AC-to-AC BIICM 1202 includes first side 340, including first node 308. First side 340 is as shown and described above with reference to FIG. 3. Each AC-to-AC BIICM 1202 also includes a full-bridge side 1212. Full-bridge side 1212 includes fifth switching device 344 serially coupled to sixth switching device 346. Second winding 348 of BIICM high-frequency transformer 336 is coupled in parallel to sixth switching device 346. In an alternative embodiment, not shown, second winding 348 is coupled in parallel to fifth switching device 344. At least one energy storage device 208 is coupled in parallel across both of fifth switching device 344 and sixth switching device 346. Furthermore, in the exemplary embodiment, full-bridge side 1212 includes seventh switching device 350 serially coupled to eighth switching device 352. Serially coupled seventh switching device 350 and eighth switching device 352 are coupled in parallel across both of fifth switching device 344 and sixth switching device 346.

Also, in the exemplary embodiment, full-bridge side 1212 of each AC-to-AC BIICM 1202 of AC-to-AC BIIC 1200 includes a ninth switching device 1214 serially coupled to a tenth switching device 1216. Serially coupled ninth switching device 1214 and tenth switching device 1216 are coupled in parallel across both of seventh switching device 350 and eighth switching device 352. A tertiary node 1218 includes connections to and between fifth switching device 344, energy storage device 208, seventh switching device 350, and ninth switching device 1214. A quaternary node 1220 includes connections to and between sixth switching device 346, energy storage device 208, eighth switching device 352, and tenth switching device 1216. Further, in the exemplary embodiment, each AC-to-AC BIICM 1202 of AC-to-AC BIIC 1200 includes a second AC node 1222 and a third AC node 1224. Second AC node 1222 is defined between seventh switch device 350 and eighth switching device 352. Second AC node 1222 is equivalent to fifth node 372. Third AC node 1224 is defined between ninth switching device 1214 and tenth switching device 1216. Third AC node 1224 is equivalent to a sixth node 1226. In an alternative embodiment, not shown, energy storage device 208 and capacitor 326 are swapped in AC-to-AC BIICM 1202. Furthermore, in the alternative embodiment, first side 340 and full-bridge side 1212 are inductively coupled through BIICM high-frequency transformer 336.

Further, in the exemplary embodiment, first 320, second 322, third 328, fourth 330, fifth 344, sixth 346, seventh 350, eighth 352, ninth 1214, and tenth 1216 switching devices include at least one switch control terminal 358 coupled to at least one switching controller, not shown in FIG. 12. Switching controller is configured to transmit at least one switch control signal to at least one of first 320, second 322, third 328, fourth 330, fifth 344, sixth 346, seventh 350, eighth 352, ninth 1214, and tenth 1216 switching devices to control its switching states. In an alternative embodiment, not shown, switching controller receives and transmits other control signals to and from other controllers located elsewhere within or outside AC-to-AC BIICM 1202.

Furthermore, in the exemplary embodiment, each first node 308 of each bi-directional AC-to-AC BIICM 1202 within each BIICM set 1201 of the three BIICM sets 1201 of AC-to-AC BIICMs 1202 in AC-to-AC BIIC 1200 are coupled together and further coupled to one first AC line 318 of at least three first AC lines 318. Each first AC line 318 of the at least three first AC lines 318 transmits a phase of a 3-phase AC power to/from each first node 308 of each bi-directional AC-to-AC BIICM 1202 within each BIICM set 1201 of the three BIICM sets 1201 of AC-to-AC BIICMs 1202 in AC-to-AC BIIC 1200. Moreover, in the exemplary embodiment, each second AC node 1222 of each topmost BIICM 1208 of each BIICM set 1201 of the three BIICM sets 1201 is coupled to one second AC line 1228 of the three second AC lines 1228. Each second AC line 1228 of the three second AC lines 1228 transmits a phase of a 3-phase AC power to/from each full-bridge side 1212 of each bi-directional AC-to-AC BIICM 1202 within each BIICM set 1201 of the three BIICM sets 1201 of AC-to-AC BIICMs 1202 in AC-to-AC BIIC 1200.

Moreover, in the exemplary embodiment, each third AC node 1224 of each bottommost BIICM within each BIICM set 1201 of the three BIICM sets 1201 are coupled together in AC-to-AC BIIC 1200. Also, in the exemplary embodiment, fifth nodes 372 and sixth nodes 1226 within each BIICM set 1201 other than topmost BIICM 1208 of topmost BIICM set 1204 and bottommost BIICM 1210 of bottommost BIICM set 1206 are serially coupled together. Further, in the exemplary embodiment, all second nodes 332 of each AC-to-AC BIICM 1202 of each BIICM set 1201 of the three BIICM sets 1201 of bi-directional AC-to-AC BIICMs 1202 in AC-to-AC BIIC 1200 are coupled together through a first nodal bus 810. Similarly, all third nodes 338 of each AC-to-AC BIICM 1202 within each BIICM set 1201 of the three BIICM sets 1201 of AC-to-AC BIICMs 1202 are coupled together through a second nodal bus 812. In other alternative nodes, not shown, one or both of first nodal bus 810 and second nodal bus 812 are not present in AC-to-AC BIIC 1200.

In operation, in the exemplary embodiment, AC-to-AC BIIC 1200 converts AC power transmitted to and/or received on three first AC lines 318 into AC power transmitted to and/or received on three second AC lines 1228. Depending on a predetermined configuration of switching controllers and switching states, it is possible to divert a portion of AC power received and/or converted by AC-to-AC BIIC 1200 into energy storage device 208 to, for example, charge it. Also, in operation of the exemplary embodiment, it is possible to divert a portion of DC power stored in energy storage device 208, i.e., to discharge it, to supplement AC power transmitted on either first AC lines 318 or second AC lines 1228. Thus, in the exemplary embodiment, AC-to-AC BIIC 1200 functions as an AC-AC power converter.

Also, in operation of the exemplary embodiment, the flow of at least one of an AC current and a DC current in the switching devices of both first side 340 and full-bridge side 1212 is controlled through at least one switch control signal transmitted from at least one switching controller to at least one switch control terminal 358 of switching devices. As such, switching controller, along with the other aforementioned features and functions of AC-to-AC BIIC 1200, facilitates maintaining a desired charging or discharging state of energy storage device 208.

Figure 13:
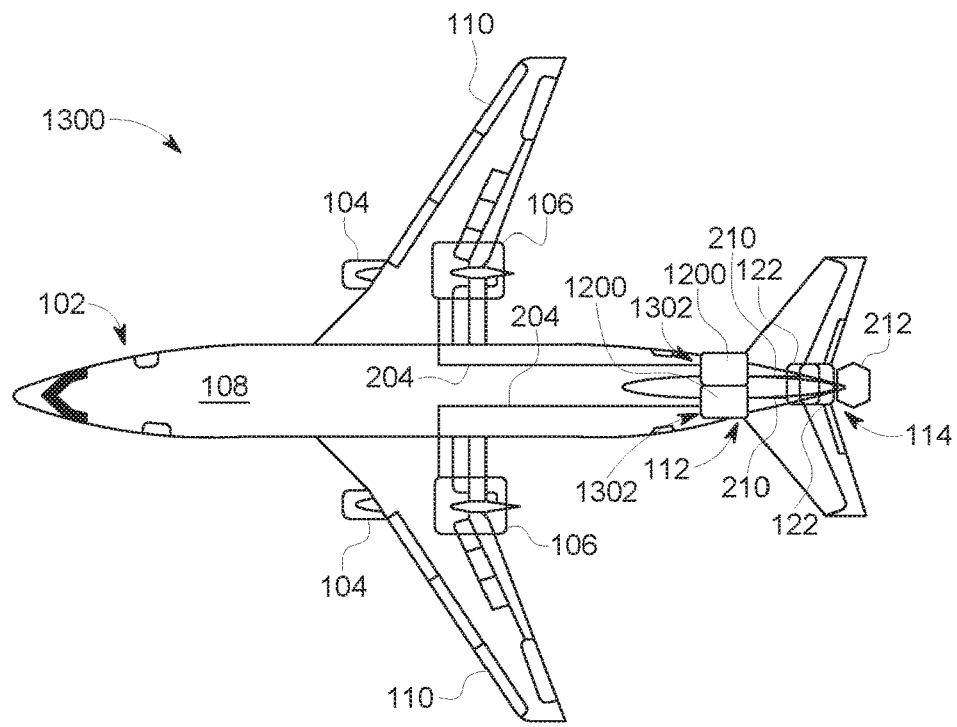
FIG. 13 is a schematic view of yet another alternative embodiment of an electric vehicle propulsion system superimposed on a plan view of an aircraft.

FIG. 13 is a schematic view of yet another alternative embodiment of an electric vehicle propulsion system 1300 superimposed on a plan view of an aircraft. In the alternative embodiment, vehicle 102 is an aircraft, as shown and described above with reference to FIG. 1. Also, in the alternative embodiment, generator 106 is coupled to drive engine 104 of vehicle 102 and to generator cable 204 of an AC type. Generator cable 204 is coupled to and between generator 106 and at least one converter set 1302 including at least one AC-to-AC BIIC 1200. Further, in the alternative embodiment, converter set 1302 is located in fuselage 108 proximate wing 110. In other alternative embodiments, not shown, converter set 1302 is located in aft portion 112 proximate tail 114. Converter set 1302 is configured to function as an AC-to-AC power converter which receives AC power from generator 106 and transmits AC power to electrical device 122 on at least one BIIC cable 210 of an AC type. Electrical device 122 includes fan motor 212 used for vehicle propulsion, including, without limitation, during taxiing on a runway, i.e., where vehicle 102 is an aircraft.

In operation of the alternative embodiment, AC power from generator 106 is converted by converter set 1302 into AC power transmitted to second converter set 704 on BIIC cable 210 of an AC type. Also, in operation of the alternative embodiment, it is possible for converter set 1302 to divert at least a portion of AC power received from generator 106 to charge energy storage device 208, not shown, in AC-to-AC BIIC 1200. It is also possible for converter set 1302 to discharge energy storage device 208 to convert power therefrom to supplement at least a portion of AC power transmitted on BIIC cable 210 to electrical device 122. Further, in operation of the exemplary embodiment, inclusion of AC-to-AC BIIC 1200 facilitates installation of electric vehicle propulsion system 1300 in vehicles 102 without requiring installation of generator rectifier 202 and replacement of AC type cable with DC type cable. Thus, electric vehicle propulsion system 1300 is particularly suited to applications involving retrofitting operations of vehicles 102 to increase specific power of known systems including, without limitation, electric vehicle propulsion system 100 shown and described above with reference to FIG. 1.

Figure 14:
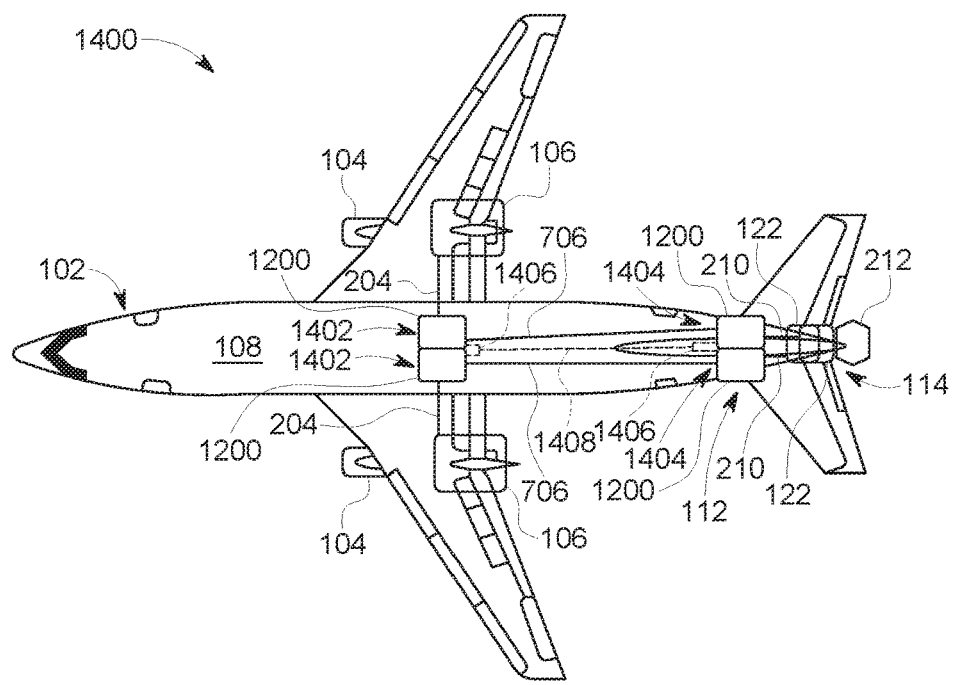
FIG. 14 is a schematic view of yet another alternative embodiment of an electric vehicle propulsion system superimposed on a plan view of an aircraft.

FIG. 14 is a schematic view of yet another alternative embodiment of an electric vehicle propulsion system 1400 superimposed on a plan view of an aircraft. In the alternative embodiment, vehicle 102 is an aircraft, as shown and described above with reference to FIG. 1. Also, in the alternative embodiment, generator 106 is coupled to drive engine 104 of vehicle 102 and to generator cable 204 of an AC type. Generator cable 204 is coupled to and between generator 106 and at least one first converter set 1402 including AC-to-AC BIIC 1200, i.e., a fore BIIC. Moreover, in the alternative embodiment, first converter set 1402 is located in fuselage 108 proximate wing 110.

Also, in the alternative embodiment, electric vehicle propulsion system 1400 includes at least one second converter set 1404. Second converter set 1404 includes at least one AC-to-AC BIIC 1200, i.e., an aft BIIC. Further, in the alternative embodiment, second converter set 1404 is located in aft portion 112 proximate tail 114. Furthermore, in the alternative embodiment, BIIC-to-BIIC cable 706 of AC type is coupled to and between first converter set 1402 and second converter set 1404. AC-to-AC BIIC 1200 of first converter set 1402 is configured to function as an AC-to-AC power converter which receives AC power from generator 106 and transmits AC power to second converter set 1404 on BIIC-to-BIIC cable 706. Moreover, in the alternative embodiment, AC-to-AC BIIC 1200 of second converter set 1404 is configured to function as an AC-to-AC power converter which receives AC power from first converter set 1402 and transmits AC power to electrical device 122 on BIIC cable 210 of an AC type. Electrical device 122 includes fan motor 212 used for vehicle propulsion, including, without limitation, during taxiing on a runway, i.e., where vehicle 102 is an aircraft.

Further, in the alternative embodiment, it is possible to include an AC interconnect 1406 coupled to and between at least two first converter sets 1402. It is also possible to include AC interconnect 1406 coupled to and between at least two second converter sets 1404. Including AC interconnects 1406 facilitates balancing or sharing the power received and/or transmitted by each first converter set 1402 of at least two first converter sets 1402 from generator 106 and/or to at least one second converter set 1404, respectively. Similarly, including AC interconnects 1406 facilitates balancing or sharing the power received and/or transmitted by each of at least two first converter sets 1402 from at least two generators 106 and at least two second converter sets 1404, respectively. Likewise, including AC interconnects 1406 facilitates balancing or sharing the power received and/or transmitted by each of at least two second converter sets 1404 from at least two first converter sets 1402 and at least two electrical devices 122, respectively. Furthermore, in the alternative embodiment, including AC interconnects 1406 facilitates AC power transmission on a single cable, including, without limitation, a bundled BIIC-to-BIIC cable 1408, to/from at least two first converter sets 1402 and at least two second converter sets 1404 in electric vehicle propulsion system 1400.

In operation of the alternative embodiment, AC power from generator 106 is converted by first converter set 1402 into AC power transmitted to second converter set 1404 on BIIC-to-BIIC cable 706. Also, in operation of the alternative embodiment, it is possible for first converter set 1402 to divert at least a portion of AC power received from generator 106 to charge energy storage device 208, not shown, in AC-to-AC BIIC 1200. It is also possible for first converter set 1402 to discharge energy storage device 208 to convert power therefrom to supplement at least a portion of AC power transmitted on BIIC-to-BIIC cable 706 to second converter set 1404. Similarly, it is possible for second converter set 1404 to divert at least a portion of AC power received first converter set 1402 to charge energy storage device 208, not shown, in AC-to-AC BIIC 1200. It is also possible for second converter set 1404 to discharge energy storage device 208 to convert power therefrom to supplement at least a portion of AC power transmitted on BIIC cable 210 to electrical device 122.

Also, in operation of the alternative embodiment, inclusion of first converter set 1402 and second converter set 1404, each including at least one AC-to-AC BIIC 1200, facilitates installation of electric vehicle propulsion system 1400 in vehicles 102 without requiring installation of generator rectifier 202 and replacement of AC type cable with DC type cable. Thus, electric vehicle propulsion system 1400 is particularly suited to applications involving retrofitting operations of vehicles 102 to increase specific power of known systems including, without limitation, electric vehicle propulsion system 100 shown and described above with reference to FIG. 1. Further, in operation of the alternative embodiment, it is possible to further increase the specific power of electric vehicle propulsion system 1400 by inclusion of AC interconnects 1406 and bundled BIIC-to-BIIC cable 1408, which provides opportunities to reduce the weight of BIIC-to-BIIC cable 706 where vehicle 102 includes a plurality of first converter sets 1402 and a plurality of second converter sets 1404.

Figure 15:
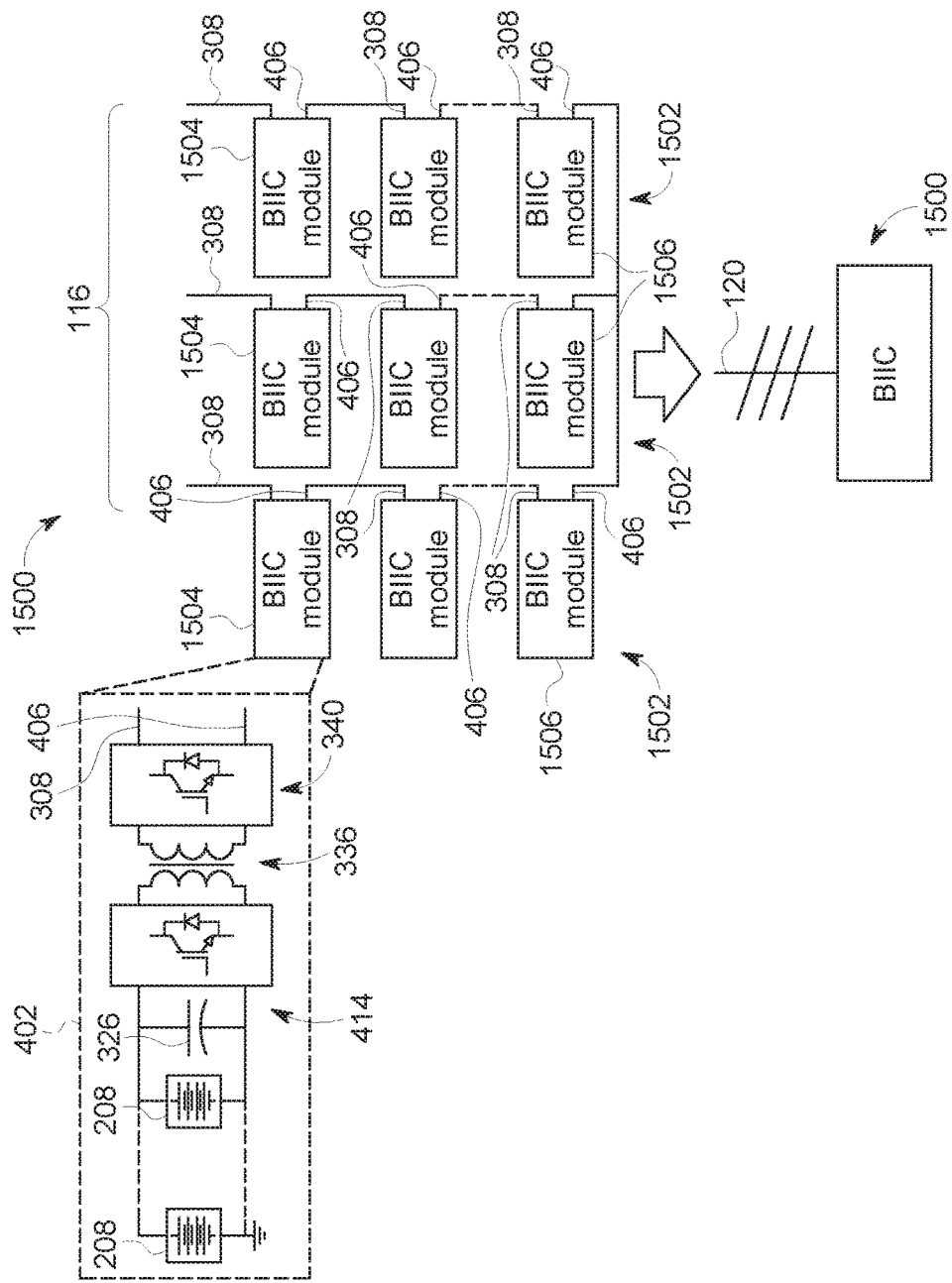
FIG. 15 is a schematic diagram of an exemplary shunt type BIIC configured for bidirectional DC-to-AC power conversion.

FIG. 15 is a schematic diagram of an exemplary shunt type BIIC 1500 configured for bidirectional DC-to-AC power conversion. In the exemplary embodiment, shunt type BIIC 1500 includes at least one bi-directional AC-to-DC BIICM 402 including a first node 308 and a second node 406. Second terminal 406 is equivalent to third node 338. Also, in the exemplary embodiment, a plurality of bi-directional AC-to-DC BIICMs 402 are arranged in at least one shunt string 1502. First node 308 of a first bi-directional AC-to-DC BIICM 402 of shunt string 1502, i.e., a topmost BIICM 1504 of each shunt string 1502 of the three shunt strings 1502 in FIG. 15, receives and/or transmits a phase of 3-phase AC power transmitted on one AC line 116 of at least three AC lines 116. Second terminal 406 of a last bi-directional AC-to-DC BIICM 402 of shunt string 1502, i.e., a bottommost BIICM 1506 of each shunt string 1502 of the three shunt strings 1502 in FIG. 15, couples to all other second terminals 406 of all other bottommost BIICMs 1506 in shunt type BIIC 1500. Further, in the exemplary embodiment, first node 308 and second terminal 406 of each bi-directional AC-to-DC BIICM 402 of shunt string 1502, other than topmost BIICM 1504 and bottommost BIICM 1506, respectively, are serially coupled.

Also, in the exemplary embodiment, bi-directional AC-to-DC BIICM 402 that may be used in shunt type BIIC 1500 includes first side 340 inductively coupled to secondary side 414 through BIICM high-frequency transformer 336, as shown and described above with reference to FIG. 4. Further, in the exemplary embodiment, bi-directional AC-to-DC BIICM 402 that may be used in shunt type BIIC 1500 includes at least one energy storage device 208 coupled in parallel across both of fifth switching device 344 and sixth switching device 346, not shown, of secondary side 414. Furthermore, in the exemplary embodiment, bi-directional AC-to-DC BIICM 402 that may be used in shunt type BIIC 1500 also includes at least one capacitor 326 coupled in parallel across both of fifth switching device 344 and sixth switching device 346, not shown, of secondary side 414. In other alternative embodiments, not shown, capacitor 326 is not present in secondary side 414.

Moreover, in the exemplary embodiment, bi-directional AC-to-DC BIICM 402 that may be used in shunt type BIIC 1500 also includes at least one switching controller, not shown in FIG. 15. Switching controller is configured to transmit at least one switch control signal to at least one of first 320, second 322, third 328, fourth 330, fifth 344, and sixth 346 switching devices, not shown, to control its switching states. In other alternative embodiments, not shown, switching controller receives and transmits other control signals to and from other controllers located elsewhere within or outside shunt type BIIC 1500, also not shown in FIG. 15. In still other embodiments, not shown, bi-directional AC-to-DC BIICM 402 that may be used in shunt type BIIC 1500 also includes at least one bypass switch 360 coupled to and between first node 308 and second terminal 406, and further coupled to bypass switch controller 368 and controlled thereby, as shown and described above with reference to FIG. 3.

In operation, in the exemplary embodiment, a phase of a 3-phase AC power is transmitted to or received from one AC line 116 of three AC lines 116 to each shunt string 1502 of the three shunt strings 1502 of shunt type BIIC 1500. Also, in operation of the exemplary embodiment, each shunt string 1502 of the three shunt strings 1502 of shunt type BIIC 1500 converts AC power received on AC line 116 into DC power to charge energy storage device 208. Shunt type BIIC 1500 is also capable to convert DC power stored in energy storage device 208, i.e., to discharge energy storage device 208, into AC power transmitted on each AC line 116 of the three AC lines 116 to electrical device 122, not shown. The proportion of AC power converted and diverted to charge energy storage device 208, and likewise, the proportion of DC power of energy storage device 208 converted and diverted to each AC line 116 of the three AC lines 116, depends on a predetermined configuration of switching controllers and switching states of shunt type BIIC 1500, as described above with reference to FIG. 4. Thus, in the exemplary embodiment, shunt type BIIC 1500 functions as a bi-directional DC-to-AC power converter.

Figure 16:
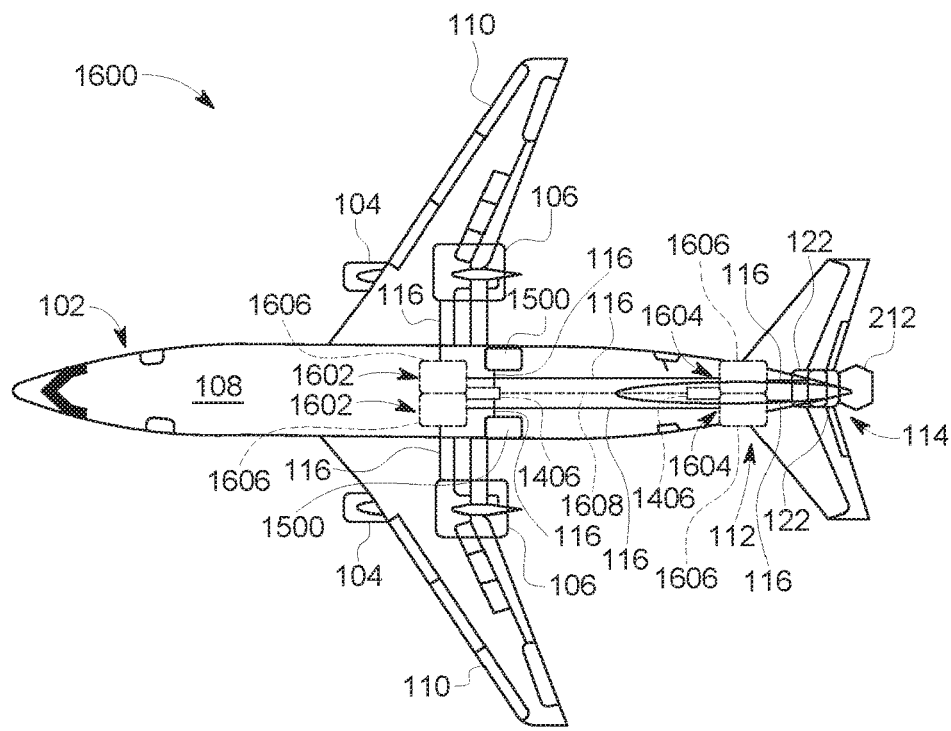
FIG. 16 is a schematic view of yet another alternative embodiment of an electric vehicle propulsion system superimposed on a plan view of an aircraft.

FIG. 16 is a schematic view of yet another alternative embodiment of an electric vehicle propulsion system 1600 superimposed on a plan view of an aircraft. In the alternative embodiment, vehicle 102 is an aircraft, as shown and described above with reference to FIG. 1. Also, in the alternative embodiment, electric vehicle propulsion system 1600 includes drive engine 104, generator 106, AC line 116, and electrical device 122, as shown and described above with reference to FIG. 1. Electric vehicle propulsion system 1600 also includes AC line 116 coupled to and between at least one first AC/AC converter set 1602 and at least one second AC/AC converter set 1604. First AC/AC converter set 1602 and second AC/AC converter set 1604 include conventional AC/AC power convertors, i.e., not BIICs as described herein. First AC/AC converter set 1602 and second AC/AC converter set 1604 each include at least one AC/AC power converter 1606, i.e., a fore AC/AC power converter 1606 and an aft AC/AC power converter 1606, respectively. Further, in the alternative embodiment, first AC/AC converter set 1602 is located in fuselage 108 proximate wing 110. Furthermore, in the alternative embodiment, second AC/AC converter set 1604 is located in aft portion 112 proximate tail 114. Also, in the alternative embodiment, at least one shunt type BIIC 1500 is coupled to AC line 116. Further, in the alternative embodiment, shunt type BIIC 1500 is located in fuselage 108 proximate wing 110. In other alternative embodiments, not shown, shunt type BIIC 1500 is located in other locations in fuselage 108, including, without limitation, in aft portion 112 proximate tail 114.

Also, in the alternative embodiment, it is possible to include an AC interconnect 1406 coupled to and between at least two first converter sets 1602. It is also possible to include AC interconnect 1406 coupled to and between at least two second AC/AC converter sets 1604. Including AC interconnects 1406 facilitates balancing or sharing the power received and/or transmitted by each of at least two first AC/AC converter sets 1602 from generator 106 and/or to second AC/AC converter set 1604, respectively. Similarly, including AC interconnects 1406 facilitates balancing or sharing the power received and/or transmitted by each of at least two first AC/AC converter sets 1602 from at least two generators 106 and at least two second AC/AC converter sets 1604, respectively. Likewise, including AC interconnects 1406 facilitates balancing or sharing the power received and/or transmitted by each of at least two second AC/AC converter sets 1604 from at least two first AC/AC converter sets 1602 and at least two electrical devices 122, respectively. Furthermore, in the alternative embodiment, including AC interconnects 1406 facilitates AC power transmission on a single cable, including, without limitation, a bundled AC line 1608, to/from at least two first AC/AC converter sets 1602 and at least two second AC/AC converter sets 1604 in electric vehicle propulsion system 1600.

In operation, in the alternative embodiment, AC current is transmitted on AC line 116 from first AC/AC converter set 1602 to second AC/AC converter set 1604. DC power from at least one energy storage device 208, not shown, within shunt type BIIC 1500 is converted to AC power, i.e., by discharging energy storage device 208, by shunt type BIIC 1500. AC power from shunt type BIIC 1500 is transmitted to AC line 116 to supply at least a portion of AC power to second AC/AC converter set 1604. Also, in operation of the alternative embodiment, it is possible for shunt type BIIC 1500 to convert AC power received on AC line 116 into DC power to charge energy storage device 208 within shunt type BIIC 1500. Thus, in the alternative embodiment, shunt type BIIC 1500 functions as a bidirectional DC-to-AC power converter.

Figure 17:
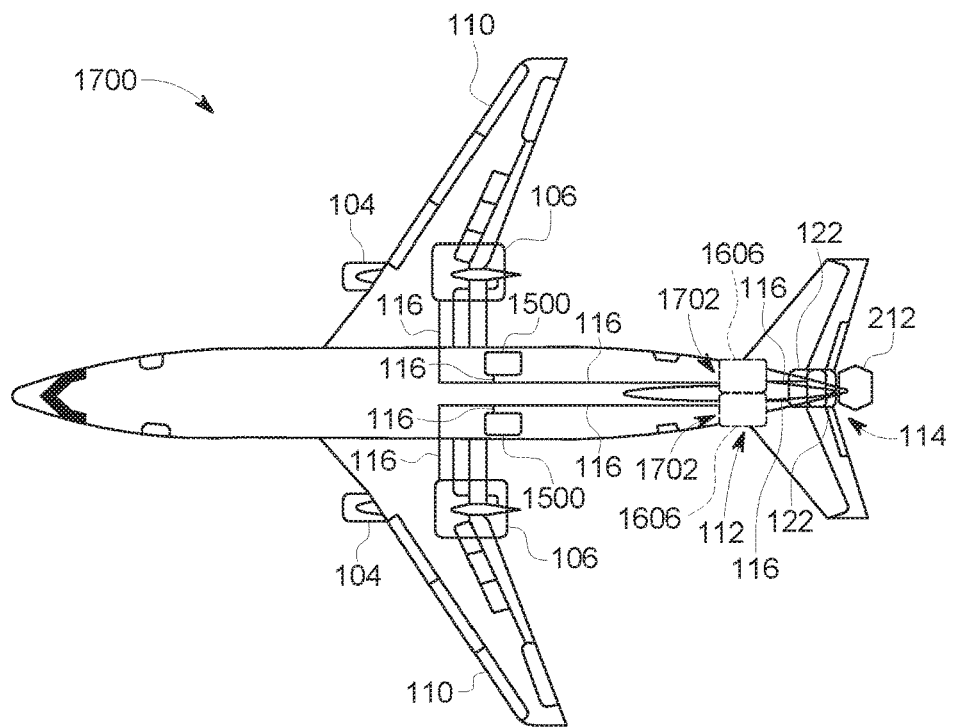
FIG. 17 is a schematic view of yet another alternative embodiment of an electric vehicle propulsion system superimposed on a plan view of an aircraft.

FIG. 17 is a schematic view of yet another alternative embodiment of an electric vehicle propulsion system 1700 superimposed on a plan view of an aircraft. In the alternative embodiment, vehicle 102 is an aircraft, as shown and described above with reference to FIG. 1. Also, in the alternative embodiment, electric vehicle propulsion system 1700 includes drive engine 104, generator 106, and electrical device 122, as shown and described above with reference to FIG. 1. Further, in the alternative embodiment, electric vehicle propulsion system 1700 includes at least one AC line 116 coupled to and between generator 106 and at least one AC/AC converter set 1702. AC/AC converter set 1702 includes conventional AC/AC power convertors, i.e., not BIICs as described herein. AC/AC converter set 1702 includes at least one AC/AC power converter 1606. Furthermore, in the alternative embodiment, AC/AC converter set 1702 is located in aft portion 112 proximate tail 114. In other alternative embodiments, not shown, AC/AC converter set 1702 is located in other locations in fuselage 108, including, without limitation, proximate wing 110.

Also, in the alternative embodiment, at least one shunt type BIIC 1500 is coupled to AC line 116. Further, in the alternative embodiment, shunt type BIIC 1500 is located in fuselage 108 proximate wing 110. In still other alternative embodiments, not shown, shunt type BIIC 1500 is located in other locations in fuselage 108, including, without limitation, in aft portion 112 proximate tail 114. Furthermore, in the alternative embodiment, it is possible to exclude at least one AC/AC converter set 1702 from electric vehicle propulsion system 1700. Where AC/AC converter set 1702 is excluded from electric vehicle propulsion system 1700, AC line 116 is coupled to and between generator 106 and electrical device 122 directly, and without an intervening AC/AC power converter 1606.

In operation, in the alternative embodiment, AC current is transmitted on AC line 116 from generator 106 to AC/AC converter set 1702. DC power from energy storage device 208, not shown, within shunt type BIIC 1500 is converted to AC power, i.e., by discharging energy storage device 208, by shunt type BIIC 1500. AC power from shunt type BIIC 1500 is transmitted to AC line 116 to supply at least a portion of AC power to AC/AC converter set 1702. Also, in operation of the alternative embodiment, it is possible for shunt type BIIC 1500 to convert AC power received on AC line 116 into DC power to charge energy storage device 208 within shunt type BIIC 1500. Thus, in the alternative embodiment, shunt type BIIC 1500 functions as a bidirectional DC-to-AC power converter.

The above-described embodiments of BIICs described herein are suited to increasing the specific power, i.e., kilowatt/kilogram (kW/kg), of electric vehicle propulsion systems by reducing the number and weight of passive components and cables. Specifically, the above-described BIICs do not require a large number of passive filtering capacitors because the rates of change of voltage with time, i.e., dv/dt, of individual battery integrated power converter modules (BIICMs) are small relative to known power converters in known electric vehicle propulsion systems. Further, specifically, tight control of dv/dt in individual BIICMs results in low levels of harmonic distortion and electromagnetic interference (EMI) relative to known power converters for electric vehicle propulsion systems. Further, the above-described BIICs are more modular, sealable, reliable, as well as easier to maintain and manufacture relative to known power converters for electric vehicle propulsion systems. Furthermore, a wide variety of energy storage devices are adaptable to use with the above-described BIICs, which facilitates incorporation of more advanced energy storage devices into electric vehicle propulsion systems without replacement of power converter components. Moreover, the above-described BIICs provide effective physical and galvanic isolation of energy storage devices, including, without limitation, DC batteries, from other components of the BIICs and the overall power system, thus enhancing safety and reliability in electric vehicle propulsion systems. As such, the above-described BIICs utilize energy storage devices to not only provide energy for electric vehicle propulsion, but also to act as voltage sources to enable multi-level power converter operations without additional film capacitors, and at the same time reduce the requirements of using filtering component elements relative to known power converters for electric vehicle propulsion systems.

Exemplary technical effects of the above-described apparatus and systems include at least one of: (a) increasing the specific power, i.e., kW/kg, of electric vehicle propulsion systems; (b) decreasing the weight of power converter components and cables of electric vehicle propulsion systems; (c) reducing the number and weight of passive components including filtering capacitors in power converter components of electric vehicle propulsion systems; (d) lowering levels of harmonic distortion and EMI in electric vehicle propulsion systems; (e) making power converter components of electric vehicle propulsion systems more modular, sealable, reliable, as well as easier to maintain and manufacture; (f) enabling utilization of energy storage devices in electric vehicle propulsion systems to not only provide energy for electric propulsion, but also to act as voltage sources to enable multi-level power converter operation without additional film capacitors; (g) facilitating incorporation of more advanced energy storage devices into electric vehicle propulsion systems without replacement of power converter components; and (h) providing physical and galvanic isolation of energy storage devices, including, without limitation, DC batteries, from other components of the BIICs and the overall power system.

Exemplary embodiments of the above-described apparatus and systems for BIICs are not limited to the specific embodiments described herein, but rather, components of apparatus and systems may be utilized independently and separately from other components described herein. For example, the apparatus and systems may also be used in combination with other systems requiring increasing the specific power of power system components including, without limitation, power converters, generators, motors, cables, and energy storage devices, and the associated methods, and are not limited to practice with only the apparatus and systems as described herein. Rather, the exemplary embodiment can be implemented and utilized in connection with many other applications, equipment, and systems that may benefit from using BIICs to improve the specific power, performance, reliability, power efficiency, EMI behavior, maintainability, and manufacturability of power converters and other power systems in various applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A battery integrated isolated power converter (BIIC) comprising:
at least one BIIC module (BIICM) string comprising a plurality of BIICMs coupled to each other, each BIICM of the plurality of BIICMs comprising:
a first BIICM circuit comprising first, second, third, and fourth switching devices coupled together, the first switching device coupled to the second switching device, the third switching device coupled to the fourth switching device, both of the first switching device and the second switching device coupled in parallel across both of the third switching device and the fourth switching device;
a second BIICM circuit comprising a fifth switching device and a sixth switching device coupled to the fifth switching device;
a BIICM high-frequency transformer coupled to and between the first BIICM circuit and the second BIICM circuit, the BIICM high-frequency transformer including a first winding and a second winding, the first winding coupled in parallel across at least one of the third switching device or the fourth switching device, the second winding coupled in parallel across at least one of the fifth switching device or the sixth switching device, wherein the first BIICM circuit and the second BIICM circuit are physically isolated and inductively coupled through the BIICM high-frequency transformer;
one or more of: (a) at least one energy storage device or (b) at least one capacitor coupled in parallel across at least one of:
both of the first switching device and the second switching device; or
both of the fifth switching device and the sixth switching device.

2. The BIIC in accordance with claim 1, wherein the BIICM high-frequency transformer comprises first windings and at least a second winding, the BIICM high-frequency transformer including more of the first windings than the at least a second winding.

3. The BIIC in accordance with claim 1, wherein:
the at least one BIICM string further comprises at least three shunt strings, each of the shunt strings comprising at least a topmost BIICM and a bottommost BIICM;
wherein the first BIICM circuit further comprises:
a first node defined between the first switching device and the second switching device;
a second node defined between the first switching device and the third switching device; and
a third node defined between the second switching device and the fourth switching device; and
at least one of the BIICs further comprises:
at least three alternating current (AC) lines, each of the AC lines configured to transmit a phase of a 3-phase AC power to and from the at least one BIIC, wherein:
the first node of the topmost BIICM of each of the shunt strings coupled to one of the AC lines;
the third node of the bottommost BIICM of each of the shunt strings coupled together; and
the first nodes and the third nodes of the BIICMs other than the topmost BIICM and the bottommost BIICM of the shunt strings are serially coupled with each other.

4. The BIIC in accordance with claim 1, further comprising:
a bypass switch coupled in parallel across at least one of the first switching device or the second switching device; and
a bypass switch controller coupled to the bypass switch, the bypass switch controller configured to transmit a first control signal to the bypass switch to open the bypass switch responsive to at least one characteristic associated with at least one of the BIICMs having a first predetermined value, the bypass switch controller also configured to transmit a second control signal to the bypass switch to close the bypass switch responsive to the at least one characteristic having a second predetermined value that is different from the first predetermined value.

5. The BIIC in accordance with claim 1, wherein the first BIICM circuit further comprises:
a first node defined between the first switching device and the second switching device;
a second node defined between the first switching device and the third switching device;
a third node defined between the second switching device and the fourth switching device;
a direct current (DC) link; and
a first AC line configured to transmit a phase of a 3-phase AC power to and from the BIIC, wherein the at least one BIICM string further comprises:

a first half string comprising a first plurality of the BIICMs comprising at least a first topmost BIICM and a first bottommost BIICM;
a second half string comprising a second plurality of the BIICMs comprising at least a second topmost BIICM and a second bottommost BIICM; and
a power terminal coupled to and between the first half string and the second half string, the power terminal further coupled to the first AC line.

6. The BIIC in accordance with claim 5, further comprising a first inductor and a second inductor, wherein:
the first inductor is coupled to and between the power terminal and the third node of the first bottommost BIICM; and
the second inductor is coupled to and between the power terminal and the first node of the second topmost BIICM.

7. The BIIC in accordance with claim 5, further comprising at least three of the first AC line and at least three panels, each of the panels comprising one of the BIICM strings, wherein:
both of the third node of the first bottommost BIICM and the first node of the second topmost BIICM are coupled to the power terminal;
both of the first node of the first topmost BIICM and the third node of the second bottommost BIICM are coupled to the DC link;
the first nodes of the BIICMs of the first half string other than the first node of the first topmost BIICM are serially coupled to the third nodes of the BIICMs of the first half string other than the third node of the first bottommost BIICM; and
the first nodes of the BIICMs of the second half string other than the first node of the second topmost BIICM are serially coupled to the third nodes of the BIICMs of the second half string other than the third node of the second bottommost BIICM.

8. The BIIC in accordance with claim 1, wherein the second BIICM circuit further comprises a seventh switching device and an eighth switching device coupled to the seventh switching device, both of the seventh switching device and the eighth switching device coupled in parallel across both of the fifth switching device and the sixth switching device.

9. The BIIC in accordance with claim 8, further comprising:
a bypass switch coupled in parallel across at least one of the seventh switching device or the eighth switching device; and
a bypass switch controller coupled to the bypass switch, the bypass switch controller configured to transmit a control signal to the bypass switch to open the bypass switch responsive to at least one characteristic associated with at least one of the BIICMs having a first predetermined value and to close the bypass switch responsive to the at least one characteristic having a second predetermined value that is different from the first predetermined value.

10. The BIIC in accordance with claim 8, wherein:
the first BIICM circuit further comprises:
a first node defined between the first switching device and the second switching device;
a second node defined between the first switching device and the third switching device; and
a third node defined between the second switching device and the fourth switching device;
the second BIICM circuit further comprises:

a fourth node defined between the sixth switching device and the eighth switching device; and a fifth node defined between the seventh switching device and the eighth switching device; and the BIIC further comprises:
  a DC link;
  a first nodal bus;
  a second nodal bus; and
  at least three first AC lines, wherein:

the at least one BIICM string further comprises at least three BIICM sets with each of the BIICM sets comprising at least a topmost BIICM and a bottommost BIICM, wherein:

the first nodes of the BIICM sets are coupled together and are further coupled to the first AC lines, each of the first AC lines configured to transmit a phase of a 3-phase AC power to and from the BIIC;

both of the fifth node of the topmost BIICM of the topmost BIICM set and the fourth node of the bottommost BIICM of the bottommost BIICM set are coupled to the DC link;

the second nodes of the BIICMs of the BIIC are coupled together through the first nodal bus;

the third nodes of the BIICMs of the BIIC are coupled together through the second nodal bus; and the fourth nodes and the fifth nodes of the BIICMs other than the topmost BIICM of the topmost BIICM set and the bottommost BIICM of the bottommost BIICM set are serially coupled.

11. The BIIC in accordance with claim 8, wherein:
the first BIICM circuit further comprises:
  a first node defined between the first switching device and the second switching device;
  a second node defined between the first switching device and the third switching device; and
  a third node defined between the second switching device and the fourth switching device;
the second BIICM circuit further comprises:
  a fourth node defined between the sixth switching device and the eighth switching device; and
  a fifth node defined between the seventh switching device and the eighth switching device;
the BIIC further comprises:
  a DC link;
  a first nodal bus;
  a second nodal bus; and
  at least three AC lines; and
the at least one BIICM string further comprises at least three BIICM sets with each of the BIICM sets comprising at least a topmost BIICM and a bottommost BIICM, wherein:
the first nodes of of the BIICM sets are coupled together and further coupled to the AC lines, each of the AC lines configured to transmit a phase of a 3-phase AC power to and from the BIIC;
each of the fifth node of the topmost BIICM and the fourth node of the bottommost BIICM of each of the BIICM sets are coupled to the DC link;

the second nodes of the BIICMs of the BIIC are coupled together through the first nodal bus;

the third nodes of the BIICMs of the BIIC are coupled together through the second nodal bus; and the fourth nodes and the fifth nodes of the BIICMs other than the topmost BIICM and the bottommost BIICM of each of the BIICM sets are serially coupled together.

12. The BIIC in accordance with claim 8, wherein the second BIICM circuit further comprises a ninth switching device and a tenth switching device coupled to the tenth switching device, both of the ninth switching device and the tenth switching device coupled in parallel across both of the seventh switching device and the eighth switching device.

13. The BIIC in accordance with claim 12, wherein:
the first BIICM circuit further comprises:
  a first node defined between the first switching device and the second switching device;
  a second node defined between the first switching device and the third switching device; and
  a third node defined between the second switching device and the fourth switching device;
the second BIICM circuit further comprises:
  a fifth node defined between the seventh switching device and the eighth switching device; and
  a sixth node defined between the ninth switching device and the tenth switching device;
the BIIC further comprises:
  a DC link;
  a first nodal bus;
  a second nodal bus;
  at least three first AC lines; and
  at least three second AC lines; wherein:
the at least one BIICM string further comprises at least three BIICM sets comprising a topmost BIICM set and a bottommost BIICM set, each of the BIICM sets comprising at least a topmost BIICM and a bottommost BIICM, wherein:
the first node of each of the topmost BIICM and the bottommost BIICM of each of the BIICM sets are coupled together and further coupled to one of the first AC lines, each of the first AC lines configured to transmit a phase of a 3-phase AC power to and from the BIIC;
the fifth node of the topmost BIICM of said of the BIICM sets is coupled to one of the second AC lines, each of the second AC lines configured to transmit a phase of a 3-phase AC power to and from the BIIC;
the second nodes of the BIICMs are coupled together through the first nodal bus;
the third nodes of the BIICMs are coupled together through the second nodal bus;
the fifth nodes and the sixth nodes and the fifth nodes of the BIICMs other than the topmost BIICM and the bottommost BIICM of each of the BIICM sets are serially coupled; and
the sixth nodes of all the bottommost BIICMs of each of the BIICM sets are coupled together.

* * * * *